United States Patent
Tenny et al.

(10) Patent No.: US 11,233,722 B2
(45) Date of Patent: Jan. 25, 2022

(54) SYSTEM AND METHOD FOR NETWORK TOPOLOGY MANAGEMENT

(71) Applicant: Futurewei Technologies, Inc., Plano, TX (US)

(72) Inventors: Nathan Edward Tenny, Portland, OR (US); Jian Wang, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 51 days.

(21) Appl. No.: 16/033,687

(22) Filed: Jul. 12, 2018

(65) Prior Publication Data

US 2019/0182140 A1   Jun. 13, 2019

Related U.S. Application Data

(60) Provisional application No. 62/597,739, filed on Dec. 12, 2017, provisional application No. 62/598,244, filed on Dec. 13, 2017.

(51) Int. Cl.
*H04L 12/26* (2006.01)
*H04L 12/24* (2006.01)
(Continued)

(52) U.S. Cl.
CPC .............. *H04L 43/16* (2013.01); *H04L 41/12* (2013.01); *H04W 24/08* (2013.01); *H04W 48/20* (2013.01); *H04W 84/047* (2013.01)

(58) Field of Classification Search
CPC .............. H04B 7/15507; H04L 5/0048; H04L 41/0803; H04L 41/12; H04L 43/16; H04W 24/08; H04W 48/20; H04W 84/047

See application file for complete search history.

(56) References Cited

U.S. PATENT DOCUMENTS

| 7,333,444 B1 * | 2/2008 | Sharapov .......... H04L 29/12801 370/255 |
| 8,804,596 B2 * | 8/2014 | Cai .................. H04W 36/0033 370/315 |

(Continued)

FOREIGN PATENT DOCUMENTS

| CN | 102196509 A | 9/2011 |
| WO | 2008066431 A1 | 6/2008 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 14)," 3GPP TS 36.300, V14.0.0, Sep. 2016, 314 pages.

(Continued)

*Primary Examiner* — Melanie Jagannathan
(74) *Attorney, Agent, or Firm* — Slater Matsil, LLP

(57) ABSTRACT

A method for operating a device includes measuring a radio condition for channels between the device and each of a plurality of candidate serving nodes, thereby producing radio condition measurements, adjusting for each of the plurality of candidate serving nodes, an associated radio condition measurement in accordance with stratum information of the candidate serving node, and selecting a serving node from the plurality of candidate serving nodes in accordance with the adjusted radio condition measurements.

32 Claims, 13 Drawing Sheets

(51) Int. Cl.
*H04W 24/08* (2009.01)
*H04W 48/20* (2009.01)
*H04W 84/04* (2009.01)

(56) References Cited

U.S. PATENT DOCUMENTS

| | | | | |
|---|---|---|---|---|
| 10,028,186 | B1* | 7/2018 | Marupaduga | H04W 4/025 |
| 10,171,159 | B1* | 1/2019 | Tailor | H04B 7/15507 |
| 10,244,495 | B1* | 3/2019 | Thong | H04W 56/001 |
| 2003/0179718 | A1* | 9/2003 | Ebata | H04L 45/122 370/255 |
| 2003/0195005 | A1* | 10/2003 | Ebata | H04W 40/06 455/445 |
| 2008/0101244 | A1* | 5/2008 | Liu | H04L 45/00 370/238 |
| 2009/0190522 | A1* | 7/2009 | Horn | H04W 40/30 370/315 |
| 2009/0245159 | A1* | 10/2009 | Oyman | H04B 7/2606 370/315 |
| 2010/0272006 | A1* | 10/2010 | Bertrand | H04B 7/2606 370/315 |
| 2012/0127880 | A1 | 5/2012 | Yu et al. | |
| 2012/0140701 | A1* | 6/2012 | Huang | H04B 7/15528 370/315 |
| 2012/0182929 | A1* | 7/2012 | Chen | H04L 63/1458 370/315 |
| 2013/0040558 | A1* | 2/2013 | Kazmi | H04B 7/15507 455/9 |
| 2013/0064116 | A1* | 3/2013 | Speight | H04B 7/15528 370/252 |
| 2013/0235839 | A1* | 9/2013 | Kim | H04L 5/0092 370/329 |
| 2013/0315134 | A1* | 11/2013 | Halfmann | H04W 84/047 370/315 |
| 2014/0044008 | A1* | 2/2014 | Skalecki | H04L 45/025 370/254 |
| 2014/0213257 | A1* | 7/2014 | Ryan | H04W 36/00835 455/436 |
| 2014/0269417 | A1* | 9/2014 | Yu | H04L 41/0803 370/254 |
| 2015/0195033 | A1* | 7/2015 | Maric | H04B 7/15592 455/418 |
| 2015/0230209 | A1* | 8/2015 | Jactat | H04W 16/26 370/315 |
| 2015/0236777 | A1* | 8/2015 | Akhtar | H04W 48/20 455/438 |
| 2016/0044616 | A1* | 2/2016 | Lee | H04W 56/004 370/350 |
| 2016/0192304 | A1* | 6/2016 | Yi | H04B 7/2656 370/311 |
| 2017/0055237 | A1* | 2/2017 | Byun | H04W 56/0015 |
| 2017/0078985 | A1* | 3/2017 | Zheng | H04J 3/0641 |
| 2018/0091416 | A1* | 3/2018 | Ghosh | H04W 40/248 |
| 2018/0092139 | A1* | 3/2018 | Novlan | H04B 7/15507 |
| 2018/0132199 | A1* | 5/2018 | Zhang | H04W 56/002 |
| 2019/0141708 | A1* | 5/2019 | Chen | H04W 72/0453 |
| 2019/0182140 | A1* | 6/2019 | Tenny | H04L 41/12 |
| 2020/0092685 | A1* | 3/2020 | Fehrenbach | H04B 7/2606 |
| 2021/0250749 | A1* | 8/2021 | Cheng | H04W 88/04 |

OTHER PUBLICATIONS

Ericsson, "Preliminary Radio Interface Concepts for mmwave Mobile Communications," Version 3.0, Document No. H2020-ICT-671650-mmMAGIC/D4.1, Jan. 7, 2015, 232 pages.

Ericsson, "Final mmMAGIC System Concept," Version 145, Document No. H2020-ICT-671650-mmMAGIC/D6.6, Dec. 7, 2017, 110 pages.

"IEEE Standard for Local and metropolitan area networks—Part 15.4: Low-Rate Wireless Personal Area Networks (LR-WPANs)," IEEE Computer Society, IEEE Std 802.15.4-2011, Revision of IEEE Std 802.15.4-2006, Sep. 5, 2011, 314 pages.

* cited by examiner

SYSTEM AND METHOD FOR NETWORK TOPOLOGY MANAGEMENT

This application claims the benefit of U.S. Provisional Application No. 62/597,739, filed on Dec. 12, 2017, entitled "System and Method for Network Topology Management," and No. 62/598,244, filed Dec. 13, 2017, entitled "System and Method for Routing Packets," both of which applications are hereby incorporated herein by reference in their entireties.

TECHNICAL FIELD

The present disclosure relates generally to a system and method for digital communications, and, in particular embodiments, to a system and method for network topology management.

BACKGROUND

Relay nodes (RNs), or simply relays, are devices that utilize bandwidth donated by a donor device to provide enhanced coverage and capacity, especially at cell edges, for example. Relays are usually low power or low cost devices, when compared to conventional cellular base station devices such as evolved NodeBs (eNBs). Relays may be connected wirelessly to the donor device. The donor device, which may be an eNB, for example, serves its own user equipments (UEs), as well as shares its radio resources with the relay(s). In Fifth Generation (5G) communications systems, integrated access and backhaul (IAB) is proposed to share the same spectrum for backhaul links as for access links. In IAB, a single path may include multiple relay hops (i.e., a path between a donor device and a UE may include multiple relays), with both tree and mesh topologies being supported.

As relays join, leave, or move in a communications system, relay information needs to be updated throughout the system. Furthermore, routing information needs to be updated throughout the system to ensure that packets are properly routed to their intended destination. Therefore, there is a need for systems and methods for network topology management.

SUMMARY

Example embodiments provide a system and method for network topology management.

In accordance with an example embodiment, a method for operating a device is provided. The method includes measuring, by the device, a radio condition for channels between the device and each of a plurality of candidate serving nodes, thereby producing radio condition measurements, adjusting, by the device, for each of the plurality of candidate serving nodes, an associated radio condition measurement in accordance with stratum information of the candidate serving node, and selecting, by the device, a serving node from the plurality of candidate serving nodes in accordance with the adjusted radio condition measurements.

Optionally, in any of the preceding embodiments, an embodiment wherein the plurality of candidate serving nodes comprises serving nodes with radio conditions that meet a first threshold, serving nodes with a number of hops to a donor access node that meet a second threshold, or both.

Optionally, in any of the preceding embodiments, an embodiment further includes performing, by the device, an access procedure with the serving node.

Optionally, in any of the preceding embodiments, an embodiment wherein stratum information of each candidate serving node is related to a distance in a network between the candidate serving node and a donor access node.

Optionally, in any of the preceding embodiments, an embodiment wherein the radio condition measurements comprise one or more of reference signal received power (RSRP) measurements, reference signal received quality (RSRQ) measurements, received signal strength indication (RSSI) measurements, signal to noise ratio (SNR) measurements, or signal plus interference to noise ratio (SINR) measurements.

Optionally, in any of the preceding embodiments, an embodiment wherein adjusting, for each of at least one of the plurality of candidate serving nodes, the associated radio condition measurement in accordance with the stratum information of the candidate serving node includes combining the associated radio condition measurement and an offset associated with the candidate serving node.

Optionally, in any of the preceding embodiments, an embodiment wherein combining the associated radio condition measurement and the offset includes adding the associated radio condition measurement and the offset.

Optionally, in any of the preceding embodiments, an embodiment wherein the stratum information is broadcast to the device.

Optionally, in any of the preceding embodiments, an embodiment wherein the stratum information is advertised by the plurality of candidate serving nodes.

Optionally, in any of the preceding embodiments, an embodiment wherein the stratum information is determined in accordance with identifiers of candidate serving nodes of the plurality of candidate serving nodes.

In accordance with an example embodiment, a method for operating a first network node is provided. The method includes determining, by the first network node, that a device has joined a second network node of a communications system including the first network node and the second network node, and sending, by the first network node to a parent network node of the first network node, a first message including a first information conveying that the device has joined the second network node, wherein the first message includes an identifier of the second network node, and wherein the parent network node has a smaller distance to a donor access node (AN) than the first network node.

Optionally, in any of the preceding embodiments, an embodiment wherein determining that the device has joined the second network node includes receiving a second message including a second information conveying that the device has joined the second network node.

Optionally, in any of the preceding embodiments, an embodiment further includes updating, by the first network node, a routing table associated with the first network node, wherein the updating of the routing table is in accordance with the second message.

Optionally, in any of the preceding embodiments, an embodiment wherein the second message is received from a third network node.

Optionally, in any of the preceding embodiments, an embodiment further includes updating, by the first network node, a routing table associated with the first network node, wherein the updating of the routing table is in accordance with the device and the second network node.

Optionally, in any of the preceding embodiments, an embodiment wherein the first network node and the second network node are the same.

Optionally, in any of the preceding embodiments, an embodiment wherein the first network node comprises one of a relay node or a donor AN.

Optionally, in any of the preceding embodiments, an embodiment wherein the device includes one of a relay node or a user equipment (UE).

In accordance with an example embodiment, a method for operating a first network node is provided. The method includes determining, by the first network node, that a device has left a second network node of a communications system including the first network node and the second network node, and sending, by the first network node to a parent network node of the first network node, a first message including a first information conveying that the device has left the second network node, wherein the first message includes an identifier of the second network node, and wherein the parent network node has a smaller distance to a donor access node (AN) than the first network node.

Optionally, in any of the preceding embodiments, an embodiment wherein determining that the device has left the second network node includes receiving a second message including a second information conveying that the device has left the second network node.

Optionally, in any of the preceding embodiments, an embodiment further includes updating, by the first network node, a routing table associated with the first network node, wherein the updating of the routing table is in accordance with the second message.

Optionally, in any of the preceding embodiments, an embodiment wherein the second message is received from a third network node.

Optionally, in any of the preceding embodiments, an embodiment further includes updating, by the first network node, a routing table associated with the first network node, wherein the updating of the routing table is in accordance with the device and the second network node.

Optionally, in any of the preceding embodiments, an embodiment wherein the first network node and the second network node are the same.

Optionally, in any of the preceding embodiments, an embodiment wherein the first network node comprises one of a relay node or a donor AN.

Optionally, in any of the preceding embodiments, an embodiment wherein the device comprises one of a relay node or a user equipment (UE).

Practice of the foregoing embodiments enables a relay or UE to select its serving node (which may be a relay or a donor device) in accordance with radio condition, as well as minimizing impact on the topology of the communications system. As an example, radio condition and communications system diameter are both considered in the selection of serving node.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Fifth Generation (5G) communications systems standards and designs are being discussed. A feature being considered is integrated access and backhaul (IAB), which uses the same spectrum for backhaul links as access links. The IAB feature may be similar in concept to relay nodes (RNs) and relaying presented in the Third Generation Partnership Project (3GPP) Long Term Evolution (LTE) Release 10 (Rel-10) technical standards. RNs in IAB may or may not have the full functionality of a Next Generation NodeB (gNB). For example, the IAB RNs may implement only the lower protocol layer entities, e.g., radio link control (RLC) entity, media access control (MAC) entity, and physical (PHY) layer entity.

However, the IAB RNs may include multi-hop capability, where a path between a donor device and a UE may include multiple RNs. This is different from 3GPP LTE Rel-10 RNs, which can support only a single hop. The IAB RNs may form different topologies, including a tree topology or a mesh topology. It is noted that for the remainder of the discussion presented herein, RNs will refer to IAB RNs, and 3GPP LTE Rel-10 RNs will be used to refer specifically to RNs compliant with the 3GPP LTE Rel-10 technical standards.

Figure 1:
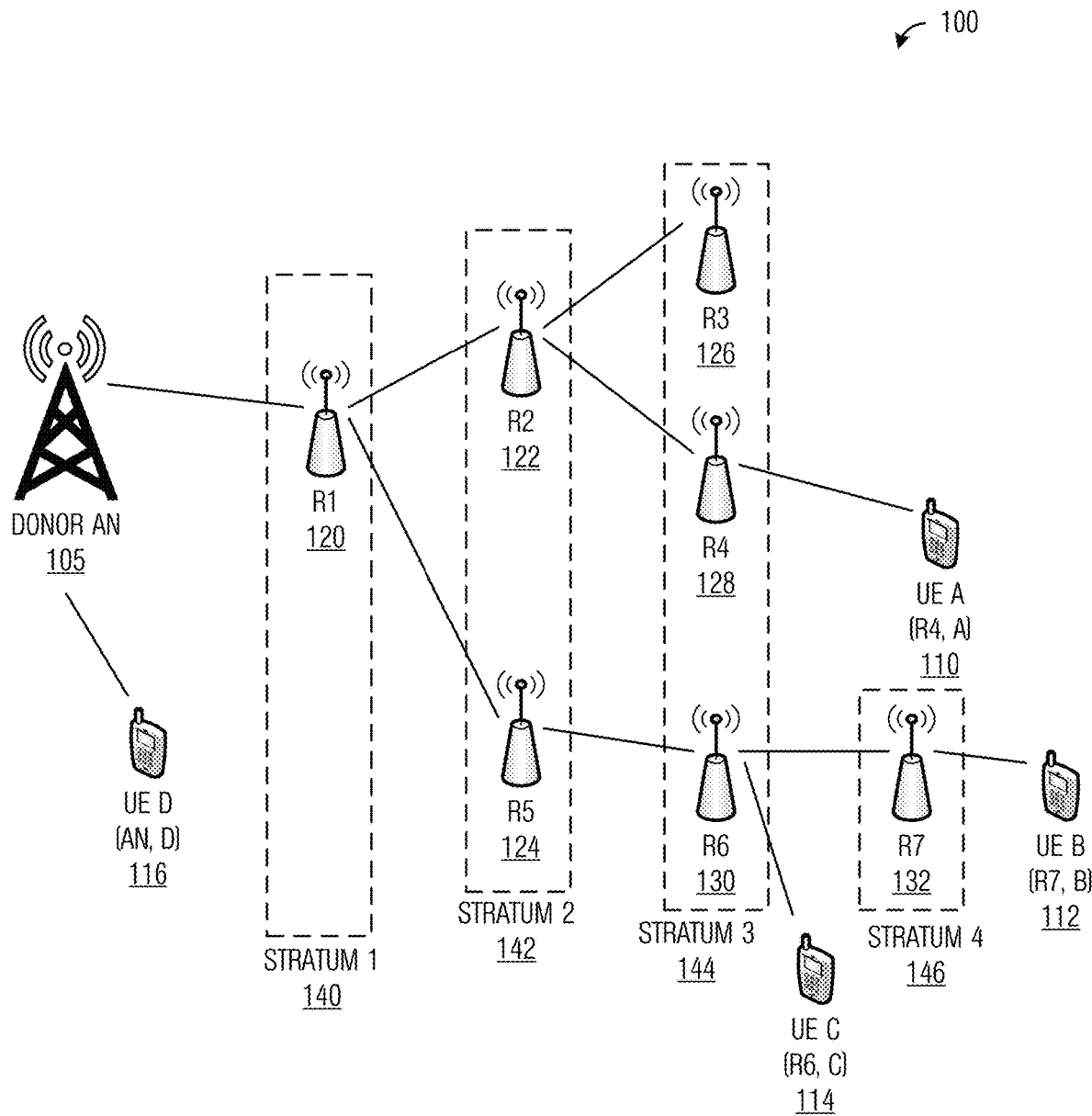
FIG. 1 illustrates an example wireless communications system according to example embodiments described herein.

FIG. 1 illustrates an example wireless communications system 100. Communications system 100 may be an example of a 5G communications system supporting IAB operation. Access nodes (ANs) may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, and so on, while UEs may also be commonly referred to as mobile stations, mobiles, terminals, users, subscribers, stations, and the like, and RNs may also be commonly referred to as remote radio heads (RRHs), pico cells, femto cells, low power cells, relay UEs, distributed units (DUs), and so on.

Communications system 100 includes a donor AN 105, which provides a portion of its spectrum to RNs to help improve coverage and capacity. Donor AN 105 serves or indirectly serves a plurality of user equipments (UEs), including UE A 110, UE B 112, UE C 114, and UE D 116. Donor AN 105 directly serves UEs, such as UE D 116. Donor AN 105 indirectly serves UEs, such as UE A 110, UE B 112, and UE C 114, through a plurality of RNs, including RN R1 120, RN R2 122, RN R5 124, RN R3 126, RN R4 128, RN R6 130, and RN R7 132. As discussed previously, a path between donor AN 105 and a UE may include a plurality of RNs. As an illustrative example, a path between donor AN 105 and UE A 110 includes RN R1 120, RN R2 122, and RN R4 128. Similarly, a path between donor AN 105 and UE B 112 includes RN R1 120, RN R5 124, RN R6 130, and RN R7 132.

The RNs in communications system 100 may be categorized based on the number of hops (e.g., distance) from donor AN 105. The distance between donor AN 105 and a RN is referred to as the stratum of the RN. As an example, RN R1 120 is one hop away from donor AN 105, and therefore, belongs in stratum 1 140, while RN R2 122 and RN R5 124 are two hops away from donor AN 105 and belong in stratum 2 142. The remaining RNs of communications system 100 shown in FIG. 1 belong in stratum 3 144 or stratum 4 146. It is noted that in communications system 100, the UEs are not associated with stratum information; however, other embodiments may include stratum information for UEs.

In a cellular operating mode, communications to and from the plurality of UEs go through donor AN 105, while in device to device communications mode, such as proximity services (ProSe) operating mode, for example, direct communication between UEs is possible. While it is understood that communications systems may employ multiple ANs and RNs capable of communicating with a number of UEs, only one AN, a plurality of RNs, and a plurality of UEs are illustrated for simplicity. Furthermore, communications systems may include RNs belonging to stratum 5 and greater. Therefore, the illustration of stratum 4 132 as the highest stratum of communications system 100 should not be limiting to the scope or the spirit of the example embodiments.

It is noted that routing packets in a fairly small network may use a wide variety of well-studied approaches. As a first illustrative example, a Routing Information Protocol (RIP) may be used. RIP is designed for general Internet use. In RIP, a routing table that includes a best route to every destination in the communication system is used. The routing table also includes next hop information, as well as a path metric. As a second illustrative example, a Thread Internet of Things (IoT) protocol, based on IEEE 802.15.4, is proposed for similar network topologies, with a network of routers (similar to the RNs) and edge devices (similar to UEs). The Thread IoT protocol uses Internet Protocol version 6 (IPv6) for addressing, together with a short address format that distinguishes between routers and child devices. A child device has the high bits of its short address set to the address of its parent router, allowing for the location of the child device to be known directly from its address (the short address). Routers communicate with periodic route advertisements that include information about their immediate neighbors, as well as path costs to all other routers in the communications system.

It is noted that packets need to be routed between the RNs to reach their final destination, either a UE or a donor AN. A routing algorithm used should be simple to apply for each RN. Ideally, the routing algorithm used should not require full knowledge of the topology of the communications system. Furthermore, RNs and UEs should be able to join, leave, or move within the communications system without breaking the routing. Additionally, when a RN or a UE joins the communications system, the RN or UE should make an intelligent decision on a serving node. As an example, a best cell principle is used, where the serving node should offer good radio conditions to keep interference to a minimum. However, network topology should also be considered, in order to keep from unnecessarily increasing the diameter of the communications system. Hence, a technique for selecting serving node or joining algorithm will balance these considerations.

According to an example embodiment, a routing algorithm that routes to a relay node that directly serves a UE is provided. In an embodiment, each RN acquires a RN identifier (RN_ID) when it joins the communications system. In an embodiment, to route a packet to a UE, the packet is addressed to (RN_ID, UE_ID), where RN_ID is the identifier of a RN that directly serves the UE and UE_ID is the identifier of the UE. Examples of identifiers include MAC addresses, radio network temporary identifiers (RN-TIs), and so forth. It is noted that other RNs are able to route to RN identified by RN_ID. It is also noted that the donor AN knows the RN_ID for each UE. As an example, this information is maintained in the RRC layer, based on signaling messages exchanged when the UE joins, leaves, or moves (i.e., when the UE changes direct serving RN).

Referring back now to FIG. 1, where each UE is shown with an address that includes an identifier of an RN that directly serves the UE. As an example, UE A no is shown with address (R4, A), where R4 identifies RN R4 128, UE B 112 is shown with address (R7, B), where R7 identifies RN R7 132, and UE C is shown with address (R6, C), where R6 identifies RN R6 130. It is noted that UE D 116 is shown with address (AN, D), where AN identifies donor AN 105 because donor AN 105 directly serves UE D 116.

According to an example embodiment, network nodes (e.g., RNs and donor AN) include routing tables that provides information about where a packet addressed to an addressed node, e.g., (RN_ID, UE_ID), should be routed. In an embodiment, the routing tables include next hop entries, which, for each UE entry in the routing tables, a record of a next node on a route path to the UE is stored. In an embodiment, the routing tables include last hop entries, which, for each UE entry in the routing tables, a record of a serving node (e.g., RN or donor AN) of the UE is stored. The serving node of the UE is the last node in the path to the UE. In an embodiment, each network node of a communication system includes a routing table.

Figure 2:
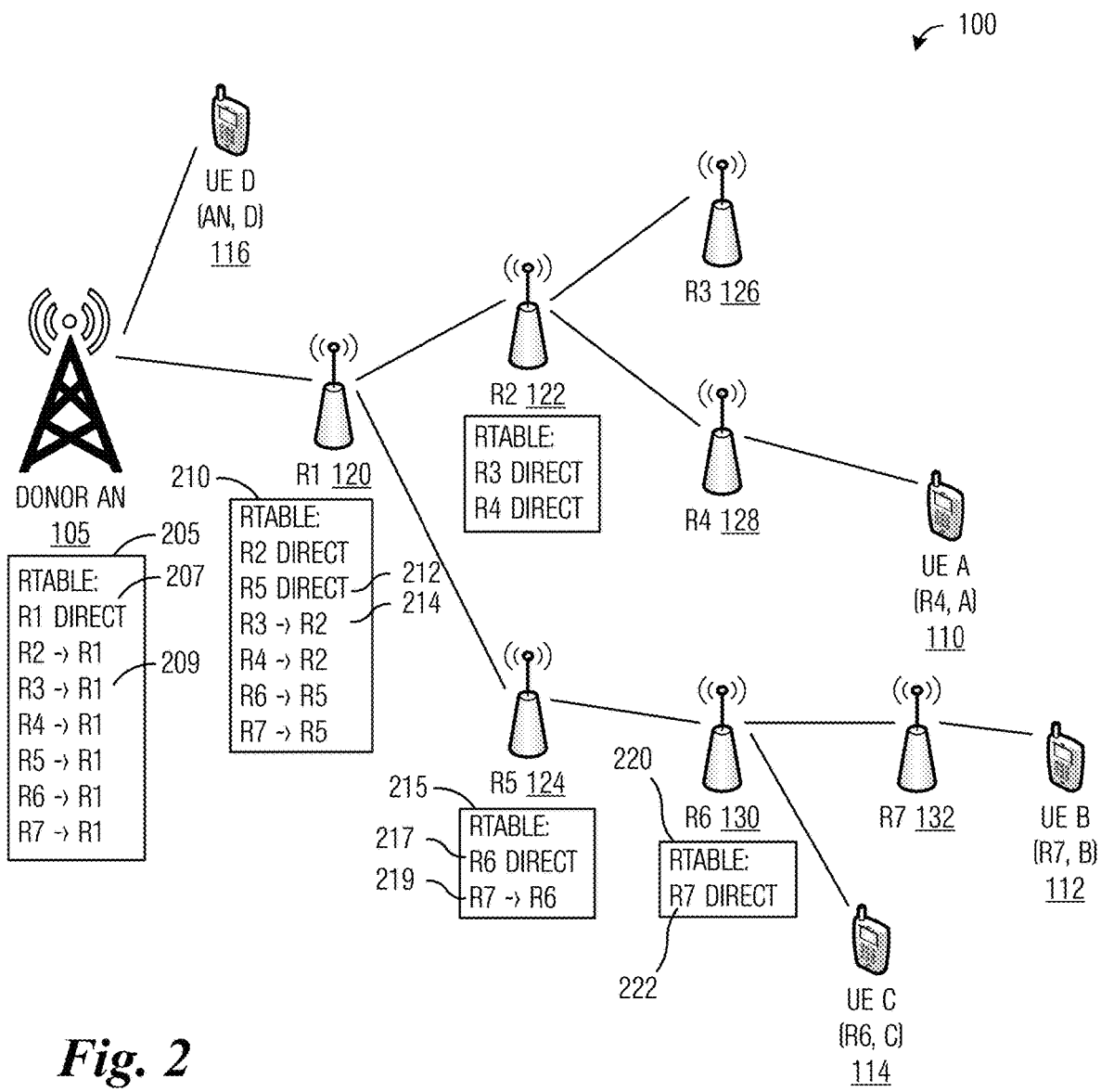
FIG. 2 illustrates a view of the communications system of FIG. 1, where network nodes include routing tables with next hop entries according to example embodiments described herein.

FIG. 2 illustrates a view of communications system 100 of FIG. 1, where network nodes include routing tables with next hop entries. As shown in FIG. 2, donor AN 105 includes routing table 205. Example entries in routing table 205 include entry 207, which provides information that there is a direct connection between donor AN 105 and RN R1 120, and entry 209, which provides information that a next hop for a path to RN R3 126 is RN R1 120. Similarly, RN R1 120 includes routing table 210. Example entries in routing table 210 include entry 212, which provides information that there is a direct connection between RN R1 120 and RN R5 124, and entry 214, which provides information that a next hop for a path to RN R3 126 is RN R2 122. Similarly, RN R5 124 includes routing table 215. Example entries in routing table 215 include entry 217, which provides information that there is a direct connection between RN R5 124 and RN R6 130, and entry 219, which provides information that a next hop for a path to RN R7 132 is RN R6 130. Similarly, RN R6 130 includes routing table 220. An example entry in routing table 220 includes entry 222, which provides information that there is a direct connection between RN R6 130 and RN R7 132. It is noted that entries for UEs are not shown in the routing tables shown in FIG. 2, however, other embodiments of routing tables may include entries for UEs. It is noted that routing tables for RNs that are not serving other RNs are not shown in FIG. 2, however, other embodiments may include routing tables for RNs not serving other RNs. Furthermore, the entries shown in the routing tables are not presented in the routing identifier with information couplet form discussed above. However, it is possible to utilize routing tables with routing identifiers and information couplets.

Figure 3:
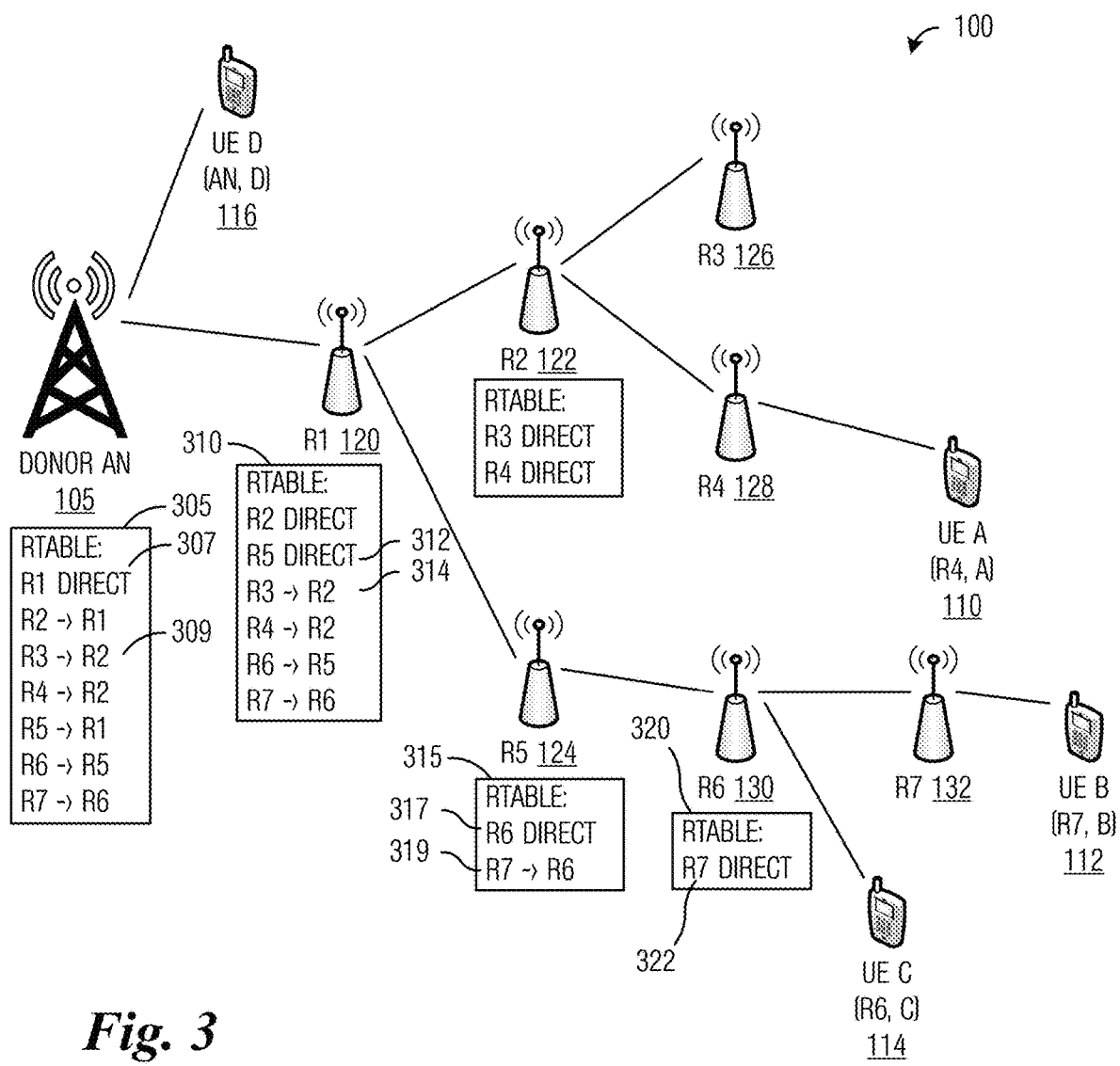
FIG. 3 illustrates a view of the communications system of FIG. 1, where network nodes include routing tables with last hop entries according to example embodiments described herein.

FIG. 3 illustrates a view of communications system 100 of FIG. 1, where network nodes include routing tables with last hop entries. As shown in FIG. 3, donor AN 105 includes routing table 305. Example entries in routing table 305 include entry 307, which provides information that there is a direct connection between donor AN 105 and RN R1 120, and entry 309, which provides information that a last hop of a path to RN R3 126 is RN R2 122. Similarly, RN R1 120 includes routing table 310. Example entries in routing table 310 include entry 312, which provides information that there is a direct connection between RN R1 120 and RN R5 124, and entry 314, which provides information that a last hop of a path to RN R3 126 is RN R2 122. Similarly, RN R5 124 includes routing table 315. Example entries in routing table 315 include entry 317, which provides information that there is a direct connection between RN R5 124 and RN R6 130, and entry 319, which provides information that a last hop of a path to RN R7 132 is RN R6 130. Similarly, RN R6 130 includes routing table 320. An example entry in routing table 320 includes entry 322, which provides information that there is a direct connection between RN R6 130 and RN R7 132. It is noted that entries for UEs are not shown in the routing tables shown in FIG. 3, however, other embodiments of routing tables may include entries for UEs. It is noted that routing tables for RNs that are not serving other RNs are not shown in FIG. 3, however, other embodiments may include routing tables for RNs not serving other RNs. Furthermore, the entries shown in the routing tables are not presented in the routing identifier with information couplet form discussed above. However, it is possible to utilize routing tables with routing identifiers and information couplets.

It is noted that in a communications system with a tree topology, the values in the routing tables are unique, and that there is only one path to the addressed node, and only one network node serves the addressed node. In a communications system with a mesh topology, the entries in the routing tables may not be unique because there may be multiple paths to the addressed node. In such a deployment, additional methods may be used to resolve the information stored in the routing tables. As an example, routing information associated with a shortest path is stored in the routing tables. As another example, routing information associated with a lowest path cost metric is stored in the routing tables. As another example, routing information associated with a shortest path with a lowest path cost metric is stored in the routing table. In a situation where multiple paths meet the resolving method, other metrics such as historical information (such as device load, device reliability, number of users, device error rate, performance constraints met, service limitations, and so on) may be used to resolve the path stored in the routing tables.

According to an example embodiment, network topology is maintained by messages propagated by a serving RN of a RN or UE joining, leaving, or moving in the communications system. As an example, a join message is sent by a new serving RN, while a leave message is sent by an old serving RN, where the new serving RN is a serving RN to which the RN or UE has connected and the old serving RN is a serving RN from which the RN or UE has disconnected. In an embodiment, network nodes (e.g., RNs or donor AN) receiving the messages use the messages to maintain their respective routing tables.

According to an example embodiment, the messages are propagated by the RNs that receive the messages towards the donor AN. In an embodiment, the RNs receiving the messages maintain their respective routing tables and propagate the messages. In an embodiment, the messages are propagated to serving RNs of the RNs receiving the messages in the next lower stratum (smaller distance to the donor AN). It is noted that the use of the stratum (distance) concept prevents routing loops, even in a communications system with a mesh topology. The messages are only sent to network nodes of a lower stratum than the sender, so routing loops are prevented.

When a device (e.g., RN or UE) joins the communications system or moves (resulting in a change of serving RN), a message (e.g., a join message) is sent by a new serving RN of the device. In an embodiment, the RNs receiving the message maintain their respective routing tables in accordance with the message and propagate the message towards the donor AN. In an embodiment, the donor AN receiving the message maintains its routing table in accordance with the message. As an example, a network node (RN or donor AN) receiving a join message adds an entry to its routing table in accordance with the join message.

When a device (e.g., RN or UE) leaves the communications system or moves (resulting in a change of serving RN), a message (e.g., a leave message) is sent by an old serving RN of the device. In an embodiment, the RNs receiving the message maintain their respective routing tables in accordance with the message and propagates the message towards the donor AN. In an embodiment, the donor AN receiving the message maintains its routing table in accordance with the message. As an example, a network node (RN or donor AN) receiving a leave message removes an entry in its routing table in accordance with the leave message.

According to an example embodiment, the message (either the leave message or the join message) includes change information comprising at least an identity of the device (e.g., RN or UE) and an identity of its serving node (e.g., RN or donor AN). The change information, in conjunction with knowledge of the network node the message was received from, enables the receiving node to maintain its routing table. In an embodiment, a join message for a device may also include information related to a path between the device and its serving node. As an example, the join message also includes link quality information for the path between the device and its serving node, path cost for the path between the device and its serving node, and so on.

Figure 4:
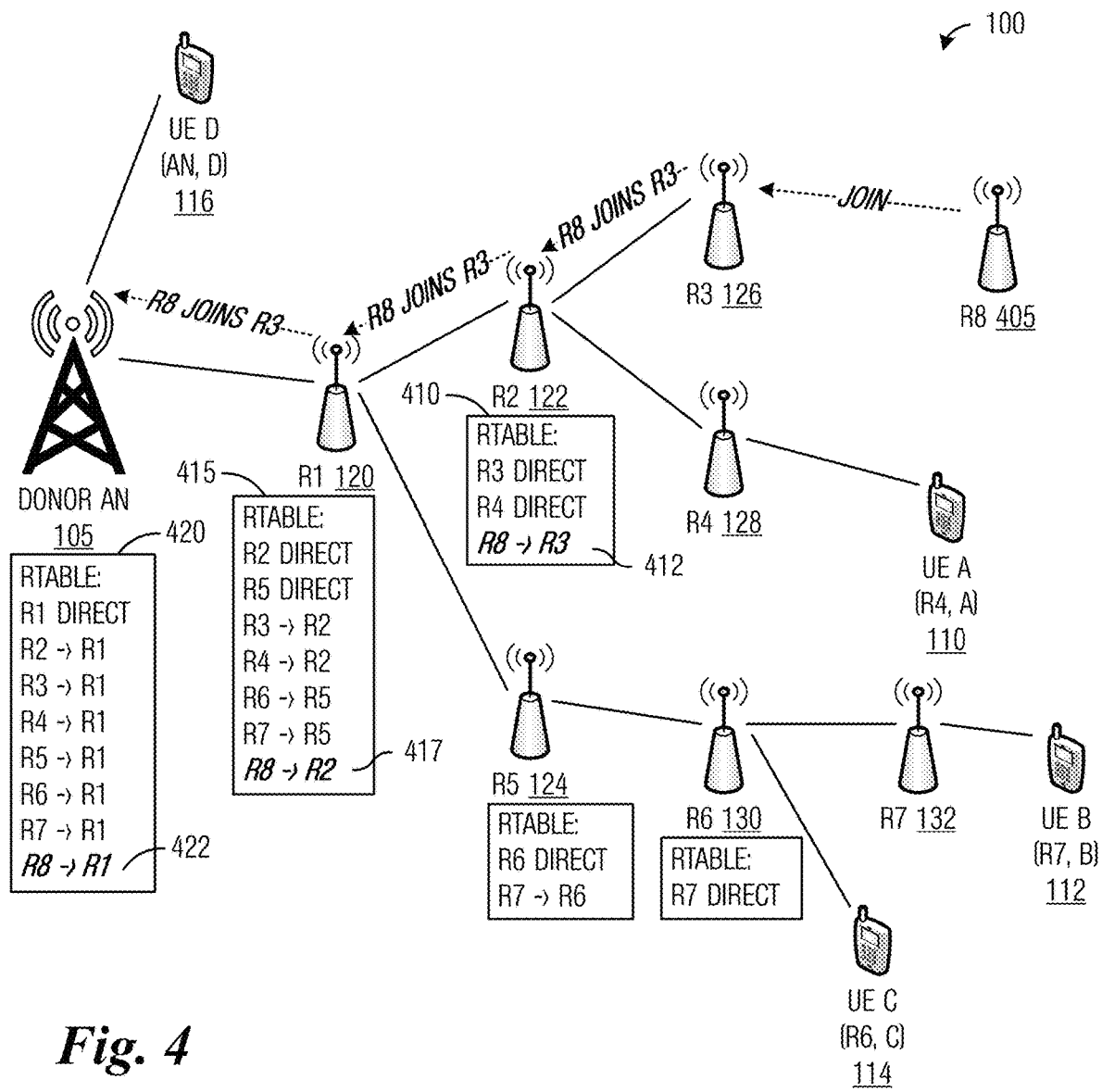
FIG. 4 illustrates a view of the communications system of FIG. 1 highlighting a new RN joining the communications system, where network nodes include routing tables with next hop entries according to example embodiments described herein.

FIG. 4 illustrates a view of communications system 100 of FIG. 1 highlighting a new RN joining communications system 100, where network nodes include routing tables with next hop entries. As shown in FIG. 4, RN R8 405 joins communications system 100. RN R8 405 connects to RN R3 126. Hence, RN R3 126 is the new serving RN of RN R8 405. RN R3 126 sends a join message to its serving network node, RN R2 122, to inform that RN R8 405 has joined communications system 100. RN R2 122 updates its routing table 410 with entry 412, which is an entry for RN R8 405. Entry 412 provides information that a next hop for a path to RN R8 405 is RN R3 126. RN R2 122 sends a join message to its serving network node, RN R1 120, to inform that RN R8 405 has joined communications system 100. RN R1 120 updates its routing table 415 with entry 417, which is an entry for RN R8 405. Entry 417 provides information that a next hop for a path to RN R8 405 is RN R2 122. RN R1 120 sends a join message to its serving network node, donor AN 105, to inform that RN R8 405 has joined communications system 100. Donor AN 105 updates its routing table 420 with entry 422, which is an entry for RN R8 405. Entry 422 provides information that a next hop for a path to RN R8 405 is RN R1 120. Donor AN 105 does not send a join message to another network node in communications system 100. The entries shown in the routing tables are not presented in the routing identifier with information couplet form discussed above. However, it is possible to utilize routing tables with routing identifiers and information couplets.

Figure 5:
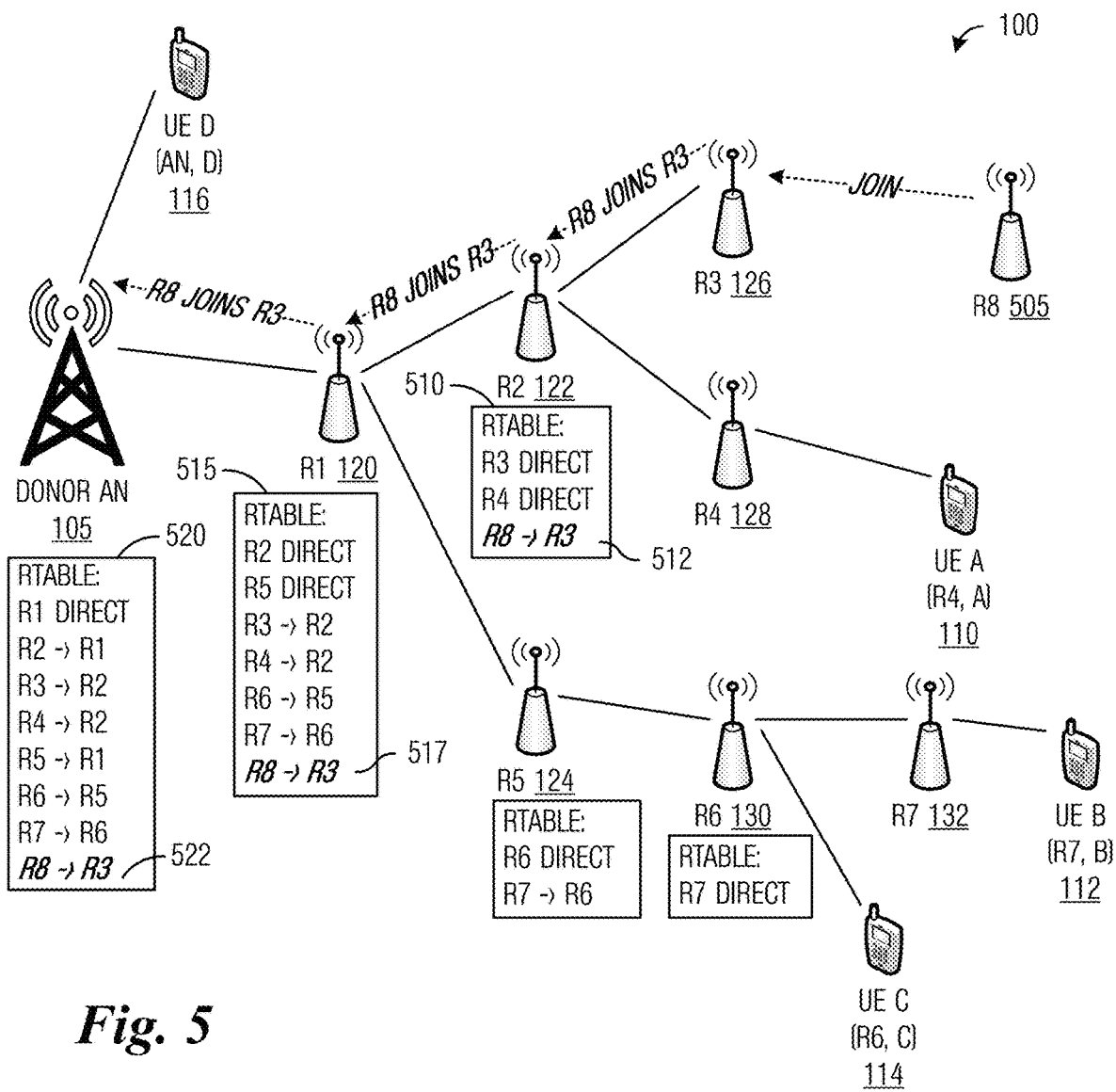
FIG. 5 illustrates a view of the communications system of FIG. 1 highlighting a new RN joining the communications system, where network nodes include routing tables with last hop entries according to example embodiments described herein.

FIG. 5 illustrates a view of communications system 100 of FIG. 1 highlighting a new RN joining communications system 100, where network nodes include routing tables with last hop entries. As shown in FIG. 5, RN R8 505 joins communications system 100. RN R8 505 connects to RN R3 126. Hence, RN R3 126 is the new serving RN of RN R8 505. RN R3 126 sends a join message to its serving network node, RN R2 122, to inform that RN R8 505 has joined communications system 100. RN R2 122 updates its routing table 510 with entry 512, which is an entry for RN R8 505. Entry 512 provides information that a last hop for a path to RN R8 505 is RN R3 126. RN R2 122 sends a join message to its serving network node, RN R1 120, to inform that RN R8 505 has joined communications system 100. RN R1 120 updates its routing table 515 with entry 517, which is an entry for RN R8 505. Entry 517 provides information that a last hop for a path to RN R8 505 is RN R3 126. RN R1 120 sends a join message to its serving node, donor AN 105, to inform that RN R8 505 has joined communications system 100. Donor AN 105 updates its routing table 520 with entry 522, which is an entry to RN R8 505. Entry 522 provides information that a last hop for a path to RN R8 505 is RN R3 126. Donor AN 105 does not send a join message to another network node in communications system 100. The entries shown in the routing tables are not presented in the routing identifier with information couplet form discussed above. However, it is possible to utilize routing tables with routing identifiers and information couplets.

Figure 6:
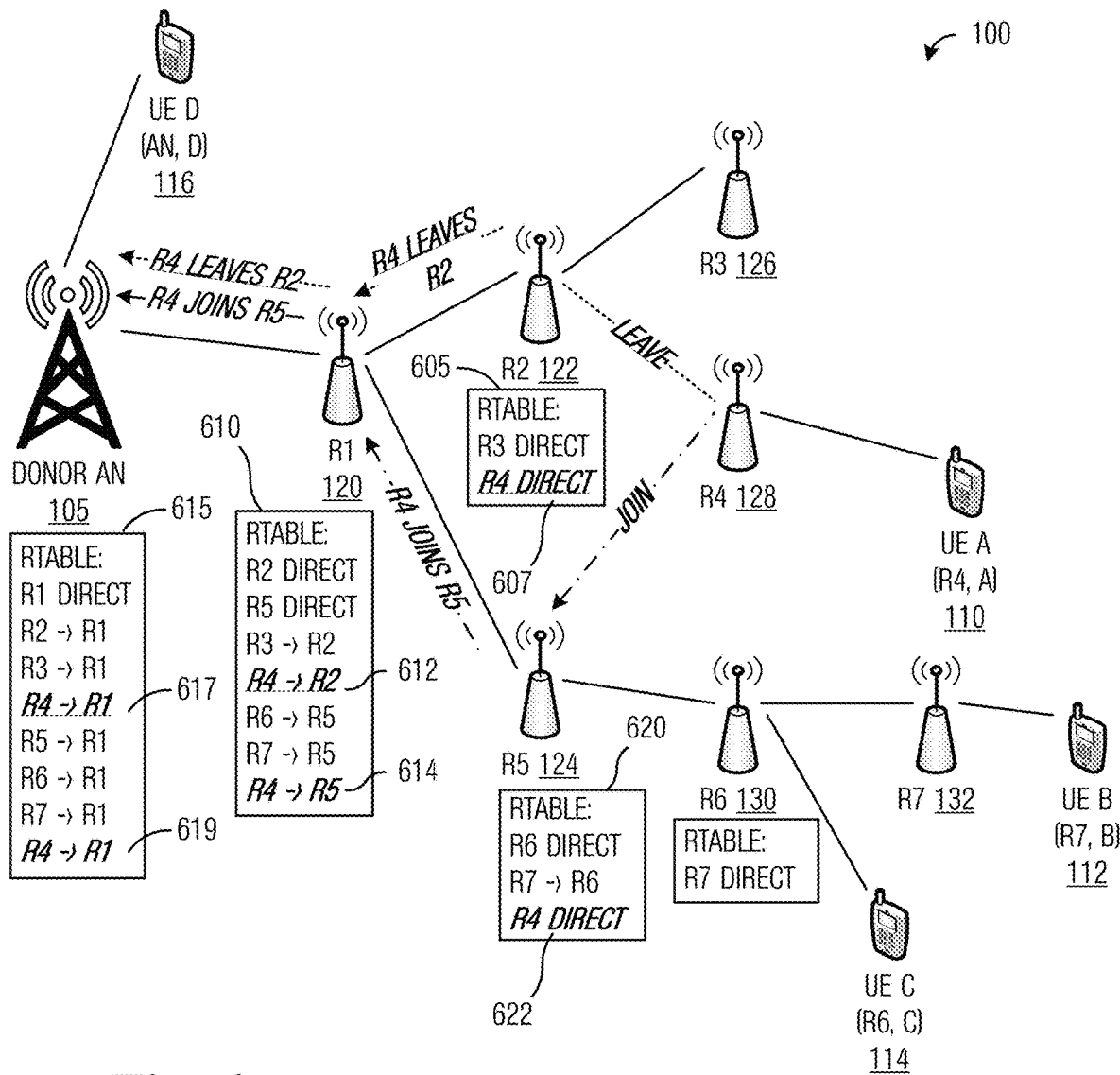
FIG. 6 illustrates a view of the communications system of FIG. 1 highlighting an RN leaving a first serving RN and joining a second serving RN, where network nodes include routing tables with next hop entries according to example embodiments described herein.

FIG. 6 illustrates a view of communications system 100 of FIG. 1 highlighting an RN leaving a first serving RN and joining a second serving RN, where network nodes include routing tables with next hop entries. As shown in FIG. 6, RN R4 128 leaves RN R2 122 and joins RN R5 124. It is noted that the order of arrival of the join and leave messages may be important. As an example, if the join message is received by a network node prior to the network node receiving the leave message, a simple addition and removal of entries in routing tables may be insufficient to prevent erroneous entries in the routing tables. As shown in FIG. 6, information associated with RN R4 128 leaving RN R2 122 is shown in underlined, bolded, and italicized text, while information associated with RN R4 128 joining RN R5 124 is shown in bolded and italicized text.

As RN R4 128 leaves RN R2 122, RN R2 122 maintains its routing table 605 by removing entry 607. RN R2 122 sends a leave message to its serving node, RN R1 120. RN R1 120 maintains its routing table 610 by removing entry 612. RN R1 120 sends a leave message to its serving node, donor AN 105. Donor AN 105 maintains its routing table 615 by removing entry 617.

As RN R4 128 joins RN R5 124, RN R5 124 maintains its routing table 620 by adding entry 622, which provides information that there is a direct connection between RN R5 124 and RN R4 128. RN R5 124 sends a join message to its serving node, RN R1 120. RN R1 120 maintains its routing table 610 by adding entry 614, which provides information that a next hop in a path to RN R4 128 is RN R5 124. RN R1 120 sends a join message to its serving node, donor AN 105. Donor AN 105 maintains its routing table 615 by adding entry 619, which provides information that a next hop in a path to RN R4 128 is RN R1 120.

As discussed previously, if a network node receives a join message prior to receiving a leave message, multiple entries for the device leaving and joining the communications system may result. As an example, if the join message from RN R5 124 is received by RN R1 120 prior to RN R1 120 receives the leave message from RN R2 122, routing table 610 may include both entries 612 and 614. Confusion may arise when RN R1 120 receives the leave message from RN R2 122. Namely, which entry (entry 612 or entry 614) should be removed?

As another example, if the join message arrives at donor AN 105 prior to the leave message arrives at donor AN 105, it would be expected that donor AN 105 adds entry 619 to routing table 615. However, entry 619 is identical to entry 617. What happens to routing table 615 depends upon how the management of routing table 615 is implemented at donor AN 105. As an example, if the join message is fully processed then duplicate entries (entry 617 and entry 619) are present in routing table 615. As an example, if the join message is processed but duplicate entries are prevented, then only entry 617 is present in routing table 615. Then, when the leave message arrives at donor AN 105, it would be expected that the routing table entry associated with RN R4 128 (e.g., entry 617, entry 619, or entries 617 and 619, depending on implementation) would be removed. As noted above, routing table 615 may include multiple entries associated with RN R4 128. Donor AN 105 may need to determine if one routing table entry or all multiple routing table entries associated with RN R4 128 should be removed. As an illustrative example, in an implementation that prevented the duplication of an existing entry, a subsequent leave message associated with the same RN or UE may be ignored. In other words, if the processing of a join message resulted in a duplicate entry in the routing table being discarded, then a subsequently received leave message associated with the same device may simply be ignored, because if the subsequently received message was processed and an associated routing table entry was removed, a valid routing table entry would be deleted.

According to an example embodiment, a routing table entry comprises a routing information triplet: <a destination address, a next hop address, and a last hop address>. The use of the routing information triplet prevents ambiguity arising from topology change in the communications system because routing table entries corresponding to join messages and leave messages are different. As an illustrative example, a routing table at donor AN 105 would have an entry with routing information triplet <RN R4 128, RN R1 120, RN R2 122> being removed due to a leave message for RN R4 128 leaving RN R2 122, while a join message for RN R4 128 joining RN R5 124 would result in an entry with routing information triplet <RN R4 128, RN R1 120, RN R5 124> being added. Hence, it no longer is important the order of processing of the join and leave messages. It is noted however, that until both messages are processed, routing tables may have multiple entries for a single destination that is mobile in the communications system. However, having multiple entries for a single destination would only result in delayed packet delivery. As an example, donor AN 105 sends a packet to RN R4 128 through RN R2 122 before a leave message for RN R4 128 arrives at donor AN 105. In such a situation, the packet would be delivered to RN R2 122 with no route to RN R4 128, and RN R2 122 may return the packet to donor AN 105, which may attempt to route the packet using a different entry in the routing table; or the leave message from RN R2 122 has arrived and the routing table has been updated and there is no longer any ambiguity in the routing table.

As related to serving node selection, a traditional technique used by a device to select a serving node is to use the best node principle, which involves selecting a candidate node with the best radio condition. In other words, the radio condition of the serving node meets a threshold. However, other considerations should be taken into consideration when selecting a serving node. An example consideration is the number of hops to the donor AN, e.g., the distance between the device and the donor AN meets a threshold. In general, more hops to the donor AN (e.g., a greater distance) results in increased latency, increased traffic on backhaul links, increased interference due to the increased traffic, and so on. The thresholds may be specified in a technical standard, set by an operator of the communications system, based on historical information, and so on.

As discussed previously, each network node has an associated stratum (distance to the donor AN), which may be discoverable by the device. As an example, the stratum of the network nodes may be signaled in broadcast information. The stratum may then be used in the selection of a serving node.

According to an example embodiment, each network node in a communications system is associated with a stratum information about the stratum, e.g., a distance between itself and a donor AN, of the network node, which is usable in the selection of a serving node. When a RN or UE joins the communications system, the stratum information may be taken into account in the selection of a potential serving RN. As an example, lower stratum values (thereby providing information that the associated network node is closer to the donor AN) may be preferred in order to reduce latency and backhaul traffic. As an example, offsets proportional to the stratum value of candidate serving nodes may be combined with radio condition measurements of the candidate serving nodes and used in the selection of the serving node. In the case of a tree topology, the stratum value of a network node may be related to the distance between the network node and the donor AN, for example. In the case of a mesh topology communications system, the stratum value of a network node may be related to the distance of the shortest path between the network node and the donor AN, for example. It is noted that network nodes that are of the same distance from the donor AN, i.e., the network nodes are of the same stratum, are compared to each other on an equal basis.

Radio condition measurements may be received signal strength measurements of transmissions made by a particular network node, such as reference signal received power (RSRP), reference signal received quality (RSRQ), received signal strength indication (RSSI), and so on, or signal to noise measurements of channels associated with a particular network node, such as a signal to noise ratio (SNR), signal plus interference to noise ratio (SINR), and so forth. Other quantitative measurements of the condition or quality of channels may also be used.

As an illustrative example, the device determines the offset for network nodes based on their stratum information and, for each network node, combines the offset with a radio condition measurement of the network node. As an example, the offset for network nodes may be specified based on a rule, such as a fixed number of dB compensation per stratum level. For example, network nodes may have an adjusted radio condition expressible as $$\text{adjusted radio condition} = \text{radio condition measurement} + N dB * \text{stratum level, where } N \text{ is the offset.}$$

For example, stratum 1 network nodes may have an adjusted radio condition expressible as $$\text{adjusted radio condition} = \text{radio condition measurement} + N dB * 1,$$

while stratum 2 network nodes may have an adjusted radio condition expressible as $$\text{adjusted radio condition} = \text{radio condition measurement} + N dB * 2,$$

and so on.

As another example, the offset for network nodes may be advertised by the network nodes themselves. The advertised offsets may be in addition to or instead of the stratum information. For example, a first network node may advertise as having a 4 dB offset, while a second network node may advertise as having a 3 dB offset, and a third network node may advertise as having a 2 dB offset, and so forth. As another example, the offset for network nodes may be determined in accordance with identifiers of the network nodes. In such a situation, the stratum information may be imbedded explicitly or implicitly in identifiers of the network nodes.

The adjusted radio conditions may be used to select a serving node. The selection of a serving node from the plurality of candidate serving nodes may be in accordance with a selection criterion. Examples of selection criterion include: best adjusted radio condition, or best adjusted radio condition with a second selection criterion. Examples of the second selection criterion include serving node load, packet traffic involving the serving node, error rates, services offered, historical information (such as historical load, historical performance data, historical error rates, and so on), and so forth.

Figure 7:
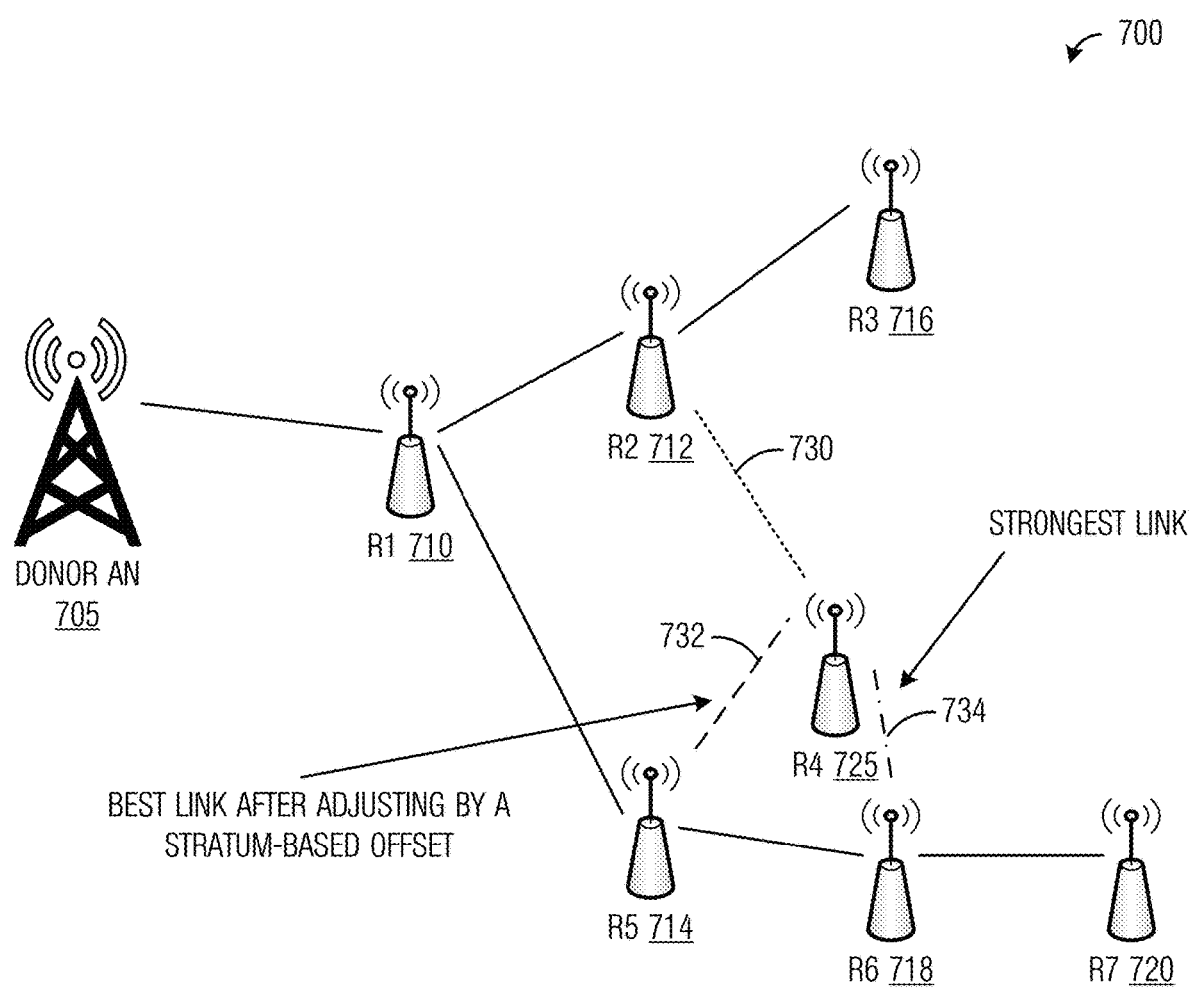
FIG. 7 illustrates a communications system highlighting serving node selection according to example embodiments described herein.

FIG. 7 illustrates a communications system 700 highlighting serving node selection. Communications system 700 includes a donor AN 705 and a plurality of RNs, including RN R1 710, RN R2 712, RN R5 714, RN R3 716, RN R6 718, RN R7 720, and RN R4 725. As shown in FIG. 7, RN R4 725 is selecting a network node to be its serving node. RN R4 725 makes radio measurements of some of the RNs of communications system 700. The radio measurements may be made based on signals transmitted by the RNs, including reference signals, control signaling, data transmissions, and so forth. Although the communications system 700 is shown using omni-directional antennas, the example embodiments presented herein are also operable in communications systems that use beamforming. The presence of beamforming may increase complexity with the inclusion of beam sweeping, beam selection, beam refinement, and so forth.

As shown in FIG. 7, RN R4 725 makes radio measurements of RN R2 712, RN R5 714, RN R3 716, and RN R6 718, shown as radio links 730, 731, 732, and 734, respectively. When comparing only radio measurements, radio link 734 between RN R4 725 and RN R6 718 is the strongest link (in terms of greatest received signal strength, SNR, SINR, RSRP, RSRQ, lowest path loss, and so forth). However, after adding offsets that are based on stratum information, such as an offset that differs based on stratum value, radio link 732 between RN R4 725 and RN R5 714 is the best link (because RN R2 712 and RN R5 714 are stratum value 2, while RN R3 716 and RN R6 718 are stratum value 3). Therefore, when serving node selection is based on a combination of radio measurement and stratum information, RN R4 725 may select RN R5 714 as serving node, while when serving node selection is based solely on radio measurement, RN R4 725 may select RN R6 718. The selection of RN R6 718 may have resulted in worse overall performance due to the greater number of hops (four hops from the donor AN 705 to RN R4 725 for RN R6 718 vs three hops for RN R5 714), increased latency, increased interference, increased traffic, and so on.

Figure 8:
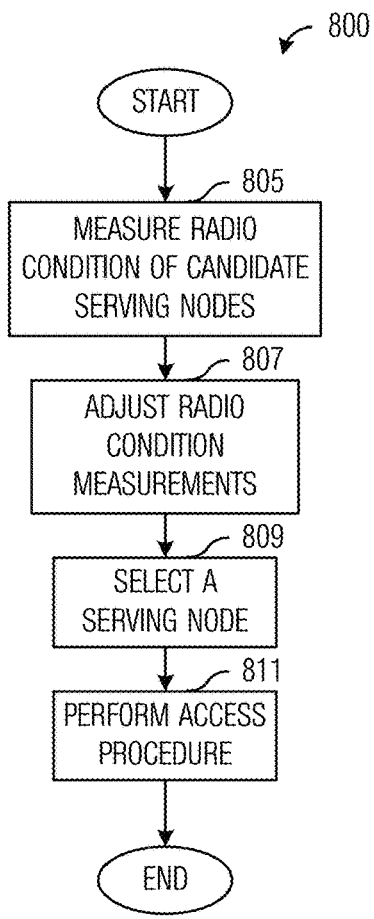
FIG. 8 illustrates a flow diagram of example operations occurring in a device joining a communications system according to example embodiments described herein.

FIG. 8 illustrates a flow diagram of example operations 800 occurring in a device joining a communications system. Operations 800 may be indicative of operations occurring at a device, such as a RN or a UE, as the device joins a communications system.

Operations 800 begin with the device making radio condition measurements of candidate serving nodes (block 805). The radio condition measurements provide a measure of the quality of channels between the device and the candidate serving nodes. The device adjusts the radio condition measurements (block 807). The device adjusts the radio condition measurements in accordance with stratum information associated with the candidate serving nodes. The stratum information may be broadcast by the communications system or advertised by the candidate serving nodes. The adjustments may involve a combination of the radio condition measurement of a particular candidate serving node with an offset based on the stratum information associated with or advertised by the particular candidate serving node, for example. The device selects a serving node (block 809). The device may select the serving node from the candidate serving nodes. The selection may be as simple as selecting a candidate serving node with the best adjusted radio condition as the serving node, for example. In a situation where there are two or more candidate serving nodes with substantially equal adjusted radio condition, the device may select from the two or more candidate serving nodes based on some other selection criteria, such as serving node load, packet traffic involving the serving node, error rates, services offered, historical information (such as historical load, historical performance data, historical error rates, and so on), and so forth. The device performs an access procedure with the serving node (block 811). The access procedure allows the device to establish a connection with the serving node. The access procedure may involve the device sending an access preamble on an access resource to the serving node, for example.

Figure 9:
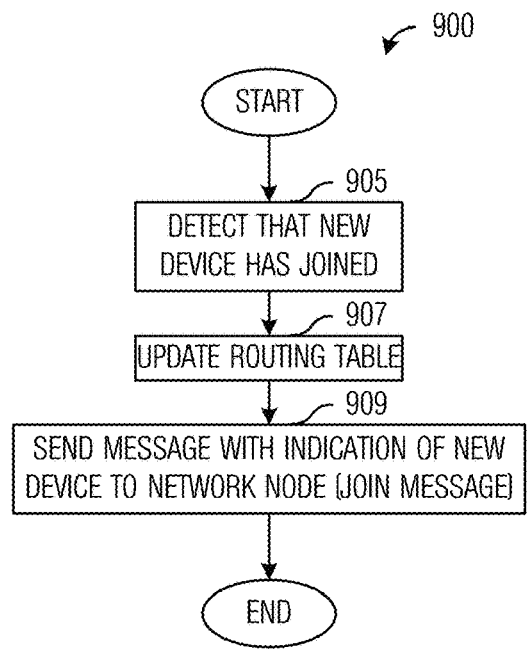
FIG. 9 illustrates a flow diagram of example operations occurring in a serving node detecting a device joining the communications system according to example embodiments described herein.

FIG. 9 illustrates a flow diagram of example operations 900 occurring in a serving node detecting a device joining the communications system. Operations 900 may be indicative of operations occurring in a serving node as the serving node detects a device joining the communications system.

Operations 900 begin with the serving node detecting that a new device has joined the communications system (block 905). As an example, the serving node may participate in an access procedure with the new device. The serving node updates its routing table (block 907). The serving node may update its routing table by adding an entry for the new device to the routing table, for example. The serving node sends a message with information conveying that the new device has joined the communications system (block 909). The message may be a join message as discussed previously. The message may be sent to a network node that is serving the serving node, for example. In other words, the message may be sent to a network node that is in a path between the serving node and the donor AN of the serving node, wherein the network node is one stratum less than the serving node. It is noted that the network node may be the donor AN itself. The message may be sent on a backhaul link.

Figure 10:
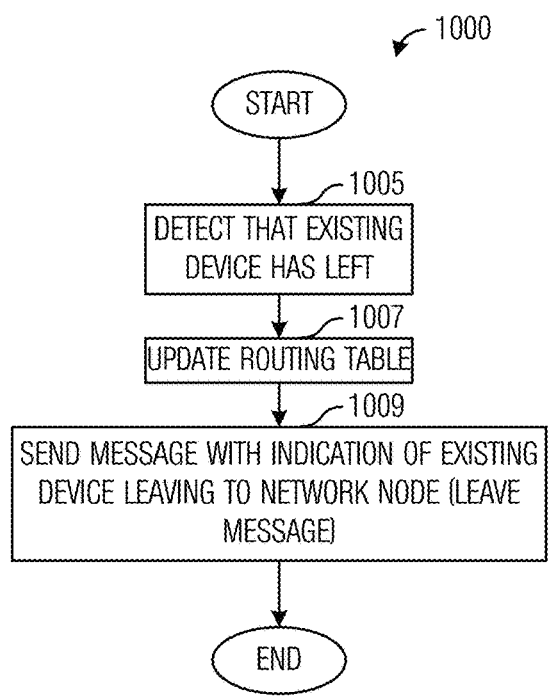
FIG. 10 illustrates a flow diagram of example operations occurring in a serving node detecting a device leaving the communications system or leaving service of a serving node in the communications system according to example embodiments described herein.

FIG. 10 illustrates a flow diagram of example operations 1000 occurring in a serving node detecting a device leaving the communications system or leaving service of a serving node in the communications system. Operations 1000 may be indicative of operations occurring in a serving node as the serving node detects a device leaving the communications system or leaving service of a serving node in the communications system.

Operations 1000 begin with the serving node detecting that a device has left the communications system, or that the device has left service of the serving node (block 1005). The serving node updates its routing table (block 1007). The serving node may update its routing table by removing an entry associated with the device from the routing table, for example. The serving node sends a message with information conveying that the device leaving the communications system or leaving service of the serving node (block 1009). The message may be a leave message as discussed previously. The message may be sent to a network node that is serving the serving node, for example. In other words, the message may be sent to a network node that is in a path between the serving node and the donor AN of the serving node, wherein the network node is one stratum less than the serving node. It is noted that the network node may be the donor AN itself. The message may be sent on a backhaul link.

In a communications system, network nodes (e.g., RNs and donor AN) include routing tables that provide information where a packet addressed to an addressed node should be routed. The addressed node may be identified (or addressed) by a routing identifier. An example of a routing identifier comprises an information couplet that includes an identifier of a serving network node of the addressed node (e.g., RN_ID) and an identifier of the addressed node (e.g., UE_ID), hence, the information couplet may be of the form (RN_ID, UE_ID) or (UE_ID, RN_ID). The routing tables include next hop entries, which, for each UE entry in the routing tables, a record of a next node on a route path to the UE is stored, or last hop entries, which, for each UE entry in the routing tables, a record of a serving network node (e.g., RN or donor AN) of the UE is stored. The serving network node of the UE is the last node in the path to the UE. It is noted that the discussion presented herein focuses on UEs being the addressed nodes of packets. However, the example embodiments presented herein are also operable with other devices, such as RNs, ANs, edge nodes, etc., being the addressed nodes of packets. In such a situation, the information couplet of the routing identifier may be of the form $(RN_{SERVING}\_ID, RN_{ADDRESSED}\_ID)$, $(RN_{ADDRESSED}\_ID, RN_{SERVING}\_ID)$, $(RN_{SERVING}\_ID, Device\_ID)$, or $(Device\_ID, RN_{SERVING}\_ID)$, $RN_{SERVING}$ is the RN serving the $RN_{ADDRESSED}$ or the Device. Therefore, the focus on UEs being the addressed nodes should not be construed as being limiting to either the scope or spirit of the example embodiments.

The network topology may be maintained by messages propagated by a serving RN of a RN or UE that is joining, leaving, or moving in the communications system. As an example, a join message is sent by a new serving RN, while a leave message is sent by an old serving RN, where the new serving RN is a serving RN to which the RN or UE has connected and the old serving RN is a serving RN from which the RN or UE has disconnected. Network nodes (e.g., RNs or donor AN) receiving the messages use the messages to maintain their respective routing tables. A detailed discussion of the use of join messages and leave messages is provided above.

The messages are propagated by the RNs that receive the messages towards the donor AN. The RNs receiving the messages maintain their respective routing tables and propagate the messages. The messages are propagated to serving RNs of the RNs receiving the messages in the next lower stratum (distance to the donor AN). It is noted that the use of the stratum (distance) concept prevents routing loops, even in a communications system with a mesh topology. The messages are only sent to network nodes of a lower stratum than the sender, so routing loops are prevented.

It is noted that the leave messages and the join messages must propagate through the communications system, such as from a serving network node of a device that joined or left the communications system to the donor AN. Therefore, it takes a finite amount of time for the leave messages and the join messages to arrive at the donor AN, as well as any intermediate RNs between the serving network node and the donor AN. The propagation time is further increased in situations where a device moves from a first serving network node to a second serving network node, because two messages (both a leave message (for the device leaving the first serving network node) and a join message (for the device joining the second serving network node)) must propagate to the donor AN. While the messages are propagating through the communications system, the routing tables of at least some of the serving network nodes involved may contain incorrect information. It is noted that the communications system may not guarantee in-order delivery of the join and leave messages, i.e., although the leave message may be transmitted by the first serving network node before the join message is transmitted by the second serving network node, it may occur that some nodes in the communications system receive the join message before the leave message.

Due to the possibility of incorrect information in some routing tables of a communications system with devices joining, leaving, or moving, a situation may arise where a packet that is in-transit becomes undeliverable because a network node currently handling the packet no longer has a valid route to the intended destination of the packet. In such a situation, the failure should be handled gracefully. A simple solution may be to simply send a non-delivery notification (NDN) in the upstream direction to the serving network node of the network node (where, for discussion purposes, the upstream direction is the direction in the path that is towards the donor AN). The NDN would eventually propagate to the donor AN and the donor AN may make a decision about how to handle the NDN. For example, the donor AN may retransmit the packet, potentially after a short delay (to allow for the incorrect information to be corrected by the completed propagation of the leave and join messages, for example). The retransmission of the packet may possibly occur along a different route.

However, propagating a NDN back to the donor AN and the resulting retransmission increases the latency associated with delivering the packet to the intended destination of the packet. Furthermore, it is not insured that the donor AN has the correct route to the intended destination. Additional delay may be incurred at the donor AN until the donor AN is able to obtain the correct route. Therefore, there is a need for systems and methods for routing packets in communications systems where network nodes and UEs are permitted to join, leave, or move the communications systems.

It is noted that when a packet becomes undeliverable, the packet may be routed towards the donor AN until the packet encounters an intermediate network node that knows how to route the packet to its intended destination. If such an intermediate network node is found, latency associated with routing the undeliverable packet back to the donor AN is saved because the packet is routed to the intended destination rather than to the donor AN.

According to an example embodiment, systems and methods for routing packets that are undeliverable to their intended destinations due to device mobility are provided. Packets may be routed using routing tables stored at network nodes (e.g., donor AN and RNs). Each routing table includes entries for each reachable network node. The entries are presented in routing identifier with information couplet form, such as the form previously discussed, with each entry comprising a network node identifier (such as RN identifier, e.g., RN_ID) and a next-hop network node for the reachable network node. Each entry in the routing table may also comprise a last hop for each reachable network node. As an example, an entry in a routing table of a network node may be an information triplet:

<destination_ID, next_hop, last_hop>, where destination_ID is an identifier of a device associated with the entry, next_hop is information (such as an identifier) of a next hop in a path between the network node (associated with the routing table) and the device associated with the entry, and last_hop is information (such as an identifier) of a last hop in the path between the network node (associated with the routing table) and the device associated with the entry. It is noted that if the last hop information is not included in the entries of the routing table, an example entry in a routing table of a network node may be an information couplet:

<destination_ID, next_hop>.

In order to deliver a packet to its intended destination, a network node sends the packet to the next-hop network node associated with the intended destination. However, if a packet cannot be delivered to its intended destination (due to incorrect or unavailable routing information in the routing table of the network node currently handling the packet), the packet may be returned to an earlier network node in the path between the donor AN and the network node currently handling the packet.

According to an example embodiment, in a situation where a packet cannot be delivered to its intended destination due to mobility of the intended destination (or intermediate network node), the packet is back-propagated through the communications system until the packet reaches a network node that is able to deliver the packet to a serving network node of the intended destination. In other words, the packet may be back-propagated back to a parent (or parent network node) of the network node currently handling the packet until the packet arrives at a network node that has a route to the intended destination of the packet. Back-propagation of the packet may involve the delivery of the packet to a network node that has a shorter path to the donor AN than the network node currently handling the packet. It is noted that the packet may be back-propagated all the way back to the donor AN. In a communications system with a tree topology, the packet is back-propagated to a serving network node of the network node currently handling the packet. In a communications system with a mesh topology, the packet may be back-propagated to any network node that has a shorter (or smaller) distance to the donor AN than the network node currently handling the packet. However, additional error checking may be performed to help ensure that the route that the packet is being sent on is not the same route that resulted in the packet being at a network node that is incapable of delivering the packet. As an example, a check to determine if the new route does not send the packet to the same network node that back-propagated the packet may be used as error checking.

As an illustrative example, a first RN that finds invalid or no routing information to route a packet to its intended destination back-propagates the packet to its serving RN (e.g., a second RN). If the second RN finds valid routing information to route the packet to its intended destination, the second RN routes the packet in accordance with the valid routing information. The second RN may first check to determine if the valid routing information does not send the packet back to the first RN prior to routing the packet. If the second RN finds invalid or no routing information to route a packet to its intended destination back-propagates the packet to its serving RN (e.g., a third RN). If the third RN finds valid routing information to route the packet to its intended destination, the third RN routes the packet in accordance with the valid routing information. The third RN may first check to determine if the valid routing information does not send the packet back to the second RN prior to routing the packet. If the third RN finds invalid or no routing information to route a packet to its intended destination back-propagates the packet to its serving RN (e.g., a fourth RN). In the worst case, the packet is back-propagated all the way back to the donor AN. The donor AN should have up-to-date routing information about the changed topology of the communications system and should be able to route the packet to its intended destination. If the donor AN does not have a valid route for the packet, the donor AN may wait to allow the messages (e.g., the join messages and the leave messages) to propagate through the communications system and the network nodes (including the donor AN) to update their respective routing tables. Alternatively, if the donor AN does not have a valid route for the packet, the donor AN may declare a delivery failure for the packet. Declaring a delivery failure may comprise such actions as discarding the packet, notifying a protocol entity that originally delivered the packet to the donor AN of the delivery failure, and so on.

The handling of the undeliverable packet may be iterative until the packet is back-propagated to the donor AN. The donor AN may make a decision about how to handle the packet. For example, the donor AN may retransmit the packet, potentially after a short delay (to allow for the incorrect information to be corrected by the completed propagation of the leave and join messages, for example). It is noted that at any network node that receives the undeliverable packet, if an alternate route is available, the network node may choose to route the packet using the alternate route.

Figure 11:
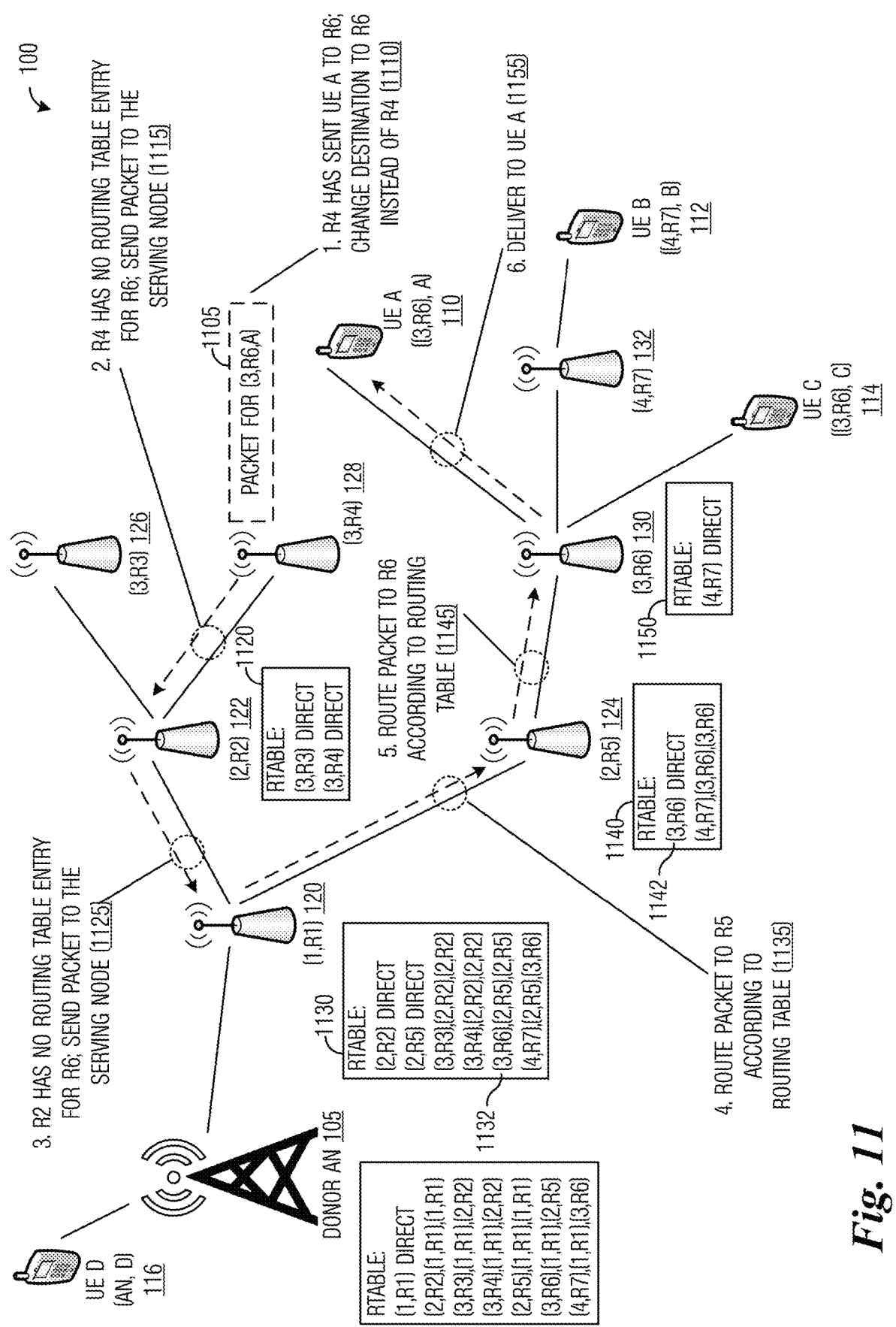
FIG. 11 illustrates a view of communications system of FIG. 1 highlighting the delivery of a packet to UE A, which has moved from RN R4 to RN R6 according to example embodiments described herein.

FIG. 11 illustrates a view of communications system 100 of FIG. 1 highlighting the delivery of a packet to UE A 110, which has moved from RN R4 128 to RN R6 130. It is noted that the routing tables shown in FIG. 11 differ from the routing tables shown in FIGS. 2-5 in that the entries include stratum values for each of the devices. Additionally, each entry also includes last hop information, if applicable.

As shown in FIG. 11, UE A 110 has left RN R4 128 and joined RN R6 130. A packet 1105, intended for UE A 110 and addressed to the serving network node of UE A 110 (RN R4 128) is currently held in RN R4 128. A problem exists in that UE A 110 has left RN R4 128 and joined RN R6 130, and the packet is addressed to RN R4 128. Hence, RN R4 128 changes the address in packet 1105 to RN R6 130 (event 1110). Further, RN R4 128 does not have a route to RN R6 130. Therefore, packet 1105 is undeliverable. Hence, RN R4 128 back-propagates packet 1105 to its serving network node, RN R2 122 (event 1115). RN R2 122 receives packet 1105, but also does not have a route to RN R6 130, i.e., routing table 1120 of RN R2 122 does not have an entry associated with RN R6 130. RN R2 122 back-propagates packet 1105 to its serving network node, RN R1 120 (event 1125).

RN R1 120 does have a route to RN R6 130 (routing table 1130 of RN R1 120 has entry 1132 that is associated with RN R6 130), and routes packet 1105 to RN R5 124 in accordance with entry 1132 (event 1135). As shown in FIG. 11, packet 1105 is routed towards UE A 110 by RN R1 120 instead of being routed to donor AN 105 by RN R1 120. Therefore, latency is reduced compared to returning the packet to donor AN 105 for redelivery. RN R5 124 does have a route to RN R6 130 (routing table 1140 of RN R5 124 has entry 1142 that is associated with RN R6 130), and routes packet 1105 to RN R6 130 in accordance with entry 1142 (event 1145). RN R6 130 is able to route packet 1105 to UE A 110 (event 1155).

A packet may also be undeliverable due to a change in the topology of the communications system, such as when a RN leaves a first serving network node and joins a second serving network node. The technique of back-propagating the packet until the packet reaches a network node that is able to deliver the packet to a serving network node of the intended destination will also be able successfully deliver the packet to its intended destination.

Figure 12:
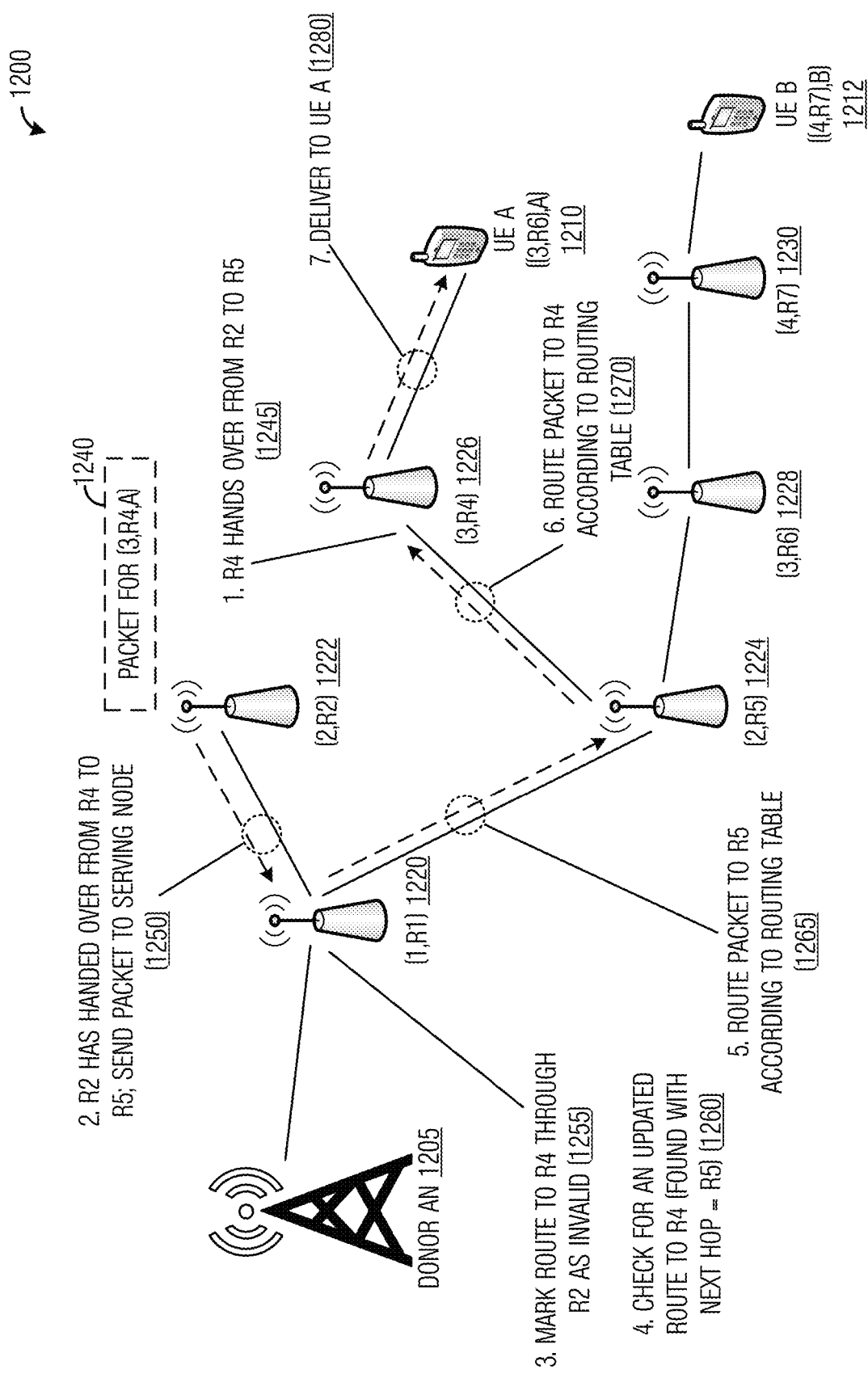
FIG. 12 illustrates a view of communications system highlighting the delivery of a packet to a UE with a last hop that has changed serving network node according to example embodiments described herein.

FIG. 12 illustrates a view of communications system 1200 highlighting the delivery of a packet to a UE with a last hop that has changed serving network node. Communications system 1200 includes a donor AN 1205, a plurality of UEs (including UE A 1210 and UE B 1212), and a plurality of RNs (including RN R1 1220, RN R2 1222, RN R5 1224, RN R4 1226, RN R6 1228, and RN R7 1230). It is noted that routing tables for the network nodes are not shown to help simplify FIG. 12. As shown in FIG. 12, packet 1240 is being processed by RN R2 1222, which at the time that packet 1240 was injected into communications system 1200, was serving RN R4 1226, which in turn, was serving UE A 1210. However, RN R4 1226 has handed over to RN R5 1224 (from RN R2 1222), while still serving UE A 1210 (event 1245).

As shown in FIG. 12, packet 1240 is intended for UE A 1210 and is addressed for RN R4 1226. Packet 1240 is handled by RN R2 1222. Packet 1240 is routed to RN R2 1222 because information about RN R4 1226 handing over to RN R5 1224 may not have propagated throughout communications system 1200. RN R2 1222 no longer has routing information for RN R4 1226, so RN R2 1222 back-propagates packet 1240 to its serving network node RN R1 1220 (event 1250). RN R1 1220, upon receiving and processing packet 1240, marks an entry associated with RN R4 1226 through RN R2 1222 as invalid (event 1255). It is noted that depending on implementation, RN R1 1220 may also remove the entry associated with RN R4 1226 through RN R2 1222. RN R1 1220 continues to search its routing table and finds an updated route for RN R4 1226 through RN R5 1228 (event 1260). It is noted that RN R1 1220 may recognize the route as updated, for example, based on determining that the updated route does not cause RN R1 1220 to deliver packet 1240 back to RN R2 1222, from which RN R1 1220 has just received the back-propagated packet 1240.

RN R1 1220 routes packet 1240 to RN R5 1224 in accordance with the updated route in its routing table (event 1265). RN R5 1224, upon receiving and processing packet 1240, finds a route for RN R4 1226 and routes packet 1240 to RN R4 1226 (event 1270). RN R4 1226, upon receiving and processing packet 1240, finds a route to UE A 1210 and routes packet 1240 to UE A 1210 (event 1280).

Figure 13:
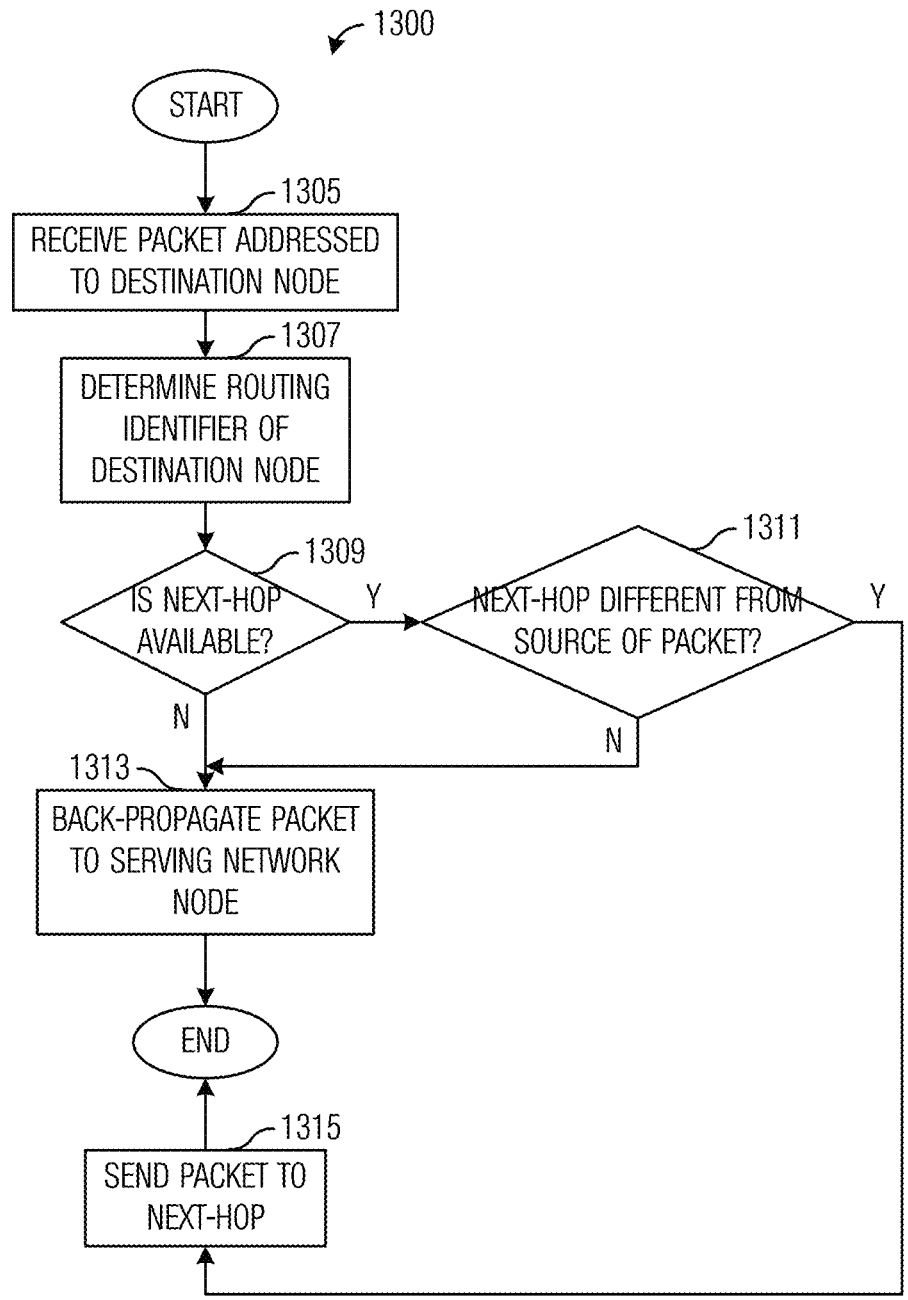
FIG. 13 illustrates a flow diagram of example operations occurring in a network node routing packets according to example embodiments described herein.

FIG. 13 illustrates a flow diagram of example operations 1300 occurring in a network node routing packets. Operations 1300 may be indicative of operations occurring in a network node, such as a RN, an AN, and so on, as the network node routes packets.

Operations 1300 begin with the network node receiving a packet addressed to a destination node (block 1305). The destination node may be a UE, a RN, an AN, an edge node, and so forth. The network node determines a routing identifier of the destination node of the packet (block 1307). As discussed previously, the routing identifier of the destination node may comprise an information couplet with an identifier of a serving network node of the destination node and an identifier of the destination node. The network node performs a check to determine if a next-hop node is available between the network node and the serving network node of the destination node (block 1309). The network node may search its routing table to determine if the next-hop node is available, for example. As an example, if there is an entry in the routing table for the serving network node of the destination node, there is a next-hop node available.

If the next-hop node is available, the network node performs a check to determine if the next-hop node is different from the source of the packet (block 1311). In other words, the network node is performing a check to determine if it is sending the packet back to the node where it just received the packet. The check may be helpful in ensuring that the network node is not routing the packet back towards a network node that is incapable of delivering the packet to its destination node. If the next-hop node is not different from the source of the packet, the network node back-propagates the packet to a serving network node of the network node (block 1313). The serving network node of the network node is also commonly referred to as the parent node (or parent network node) of the network node. In general, the serving network node of the network node may be characterized as having a smaller network distance in the communications system to the donor AN than the network node. Operations 1300 may terminate.

If the next-hop node is different from the source of the packet, the network node routes the packet to the next-hop node (block 1315). Operations 1300 may terminate.

If the next-hop node is not available, the network node back-propagates the packet to a serving network node of the network node (block 1313). Operations 1300 may terminate.

In an alternate example embodiment, instead of back-propagating the packet to the serving network node of the network node (event 1313), the network node back-propagates a NDN. In such a situation, a network node that receives a NDN may immediately back-propagate the NDN to its serving network node.

Figure 14:
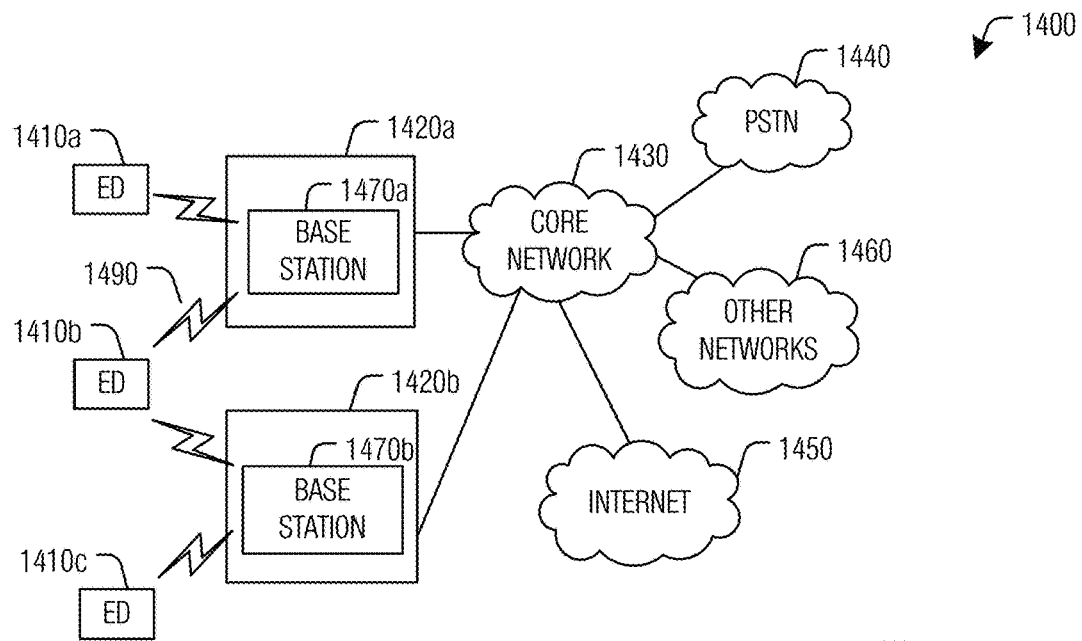
FIG. 14 illustrates an example communication system according to example embodiments described herein.

FIG. 14 illustrates an example communication system 1400. In general, the system 1400 enables multiple wireless or wired users to transmit and receive data and other content. The system 1400 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1400 includes electronic devices (ED) 1410a-1410c, radio access networks (RANs) 1420a-1420b, a core network 1430, a public switched telephone network (PSTN) 1440, the Internet 1450, and other networks 1460. While certain numbers of these components or elements are shown in FIG. 14, any number of these components or elements may be included in the system 1400.

The EDs 1410a-1410c are configured to operate or communicate in the system 1400. For example, the EDs 1410a-1410c are configured to transmit or receive via wireless or wired communication channels. Each ED 1410a-1410c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1420a-1420b here include base stations 1470a-1470b, respectively. Each base station 1470a-1470b is configured to wirelessly interface with one or more of the EDs 1410a-1410c to enable access to the core network 1430, the PSTN 1440, the Internet 1450, or the other networks 1460. For example, the base stations 1470a-1470b may include (or be) one or more of several well-known devices, such as a base transceiver station (BTS), a Node-B (NodeB), an evolved NodeB (eNodeB), a Next Generation NodeB (gNB), a Home NodeB, a Home eNodeB, a site controller, an access point (AP), or a wireless router. The EDs 1110a-1110c are configured to interface and communicate with the Internet 1450 and may access the core network 1430, the PSTN 1440, or the other networks 1460.

In the embodiment shown in FIG. 14, the base station 1470a forms part of the RAN 1420a, which may include other base stations, elements, or devices. Also, the base station 1470b forms part of the RAN 1420b, which may include other base stations, elements, or devices. Each base station 1470a-1470b operates to transmit or receive wireless signals within a particular geographic region or area, sometimes referred to as a "cell." In some embodiments, multiple-input multiple-output (MIMO) technology may be employed having multiple transceivers for each cell.

The base stations 1470a-1470b communicate with one or more of the EDs 1410a-1410c over one or more air interfaces 1490 using wireless communication links. The air interfaces 1490 may utilize any suitable radio access technology.

It is contemplated that the system 1400 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1420a-1420b are in communication with the core network 1430 to provide the EDs 1410a-1410c with voice, data, application, Voice over Internet Protocol (VoIP), or other services. Understandably, the RANs 1420a-1420b or the core network 1430 may be in direct or indirect communication with one or more other RANs (not shown). The core network 1430 may also serve as a gateway access for other networks (such as the PSTN 1440, the Internet 1450, and the other networks 1460). In addition, some or all of the EDs 1410a-1410c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1450.

Although FIG. 14 illustrates one example of a communication system, various changes may be made to FIG. 14. For example, the communication system 1400 could include any number of EDs, base stations, networks, or other components in any suitable configuration.

Figure 15A:
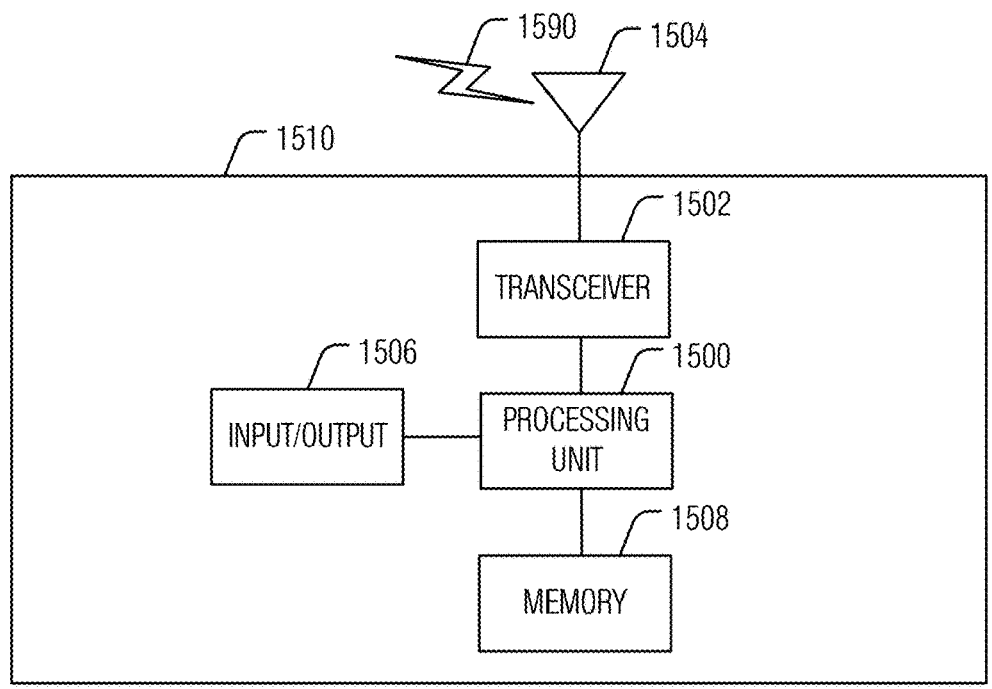
FIGS. 15A and 15B illustrate example devices that may implement the methods and teachings according to this disclosure according to example embodiments described herein.
Figure 15B:
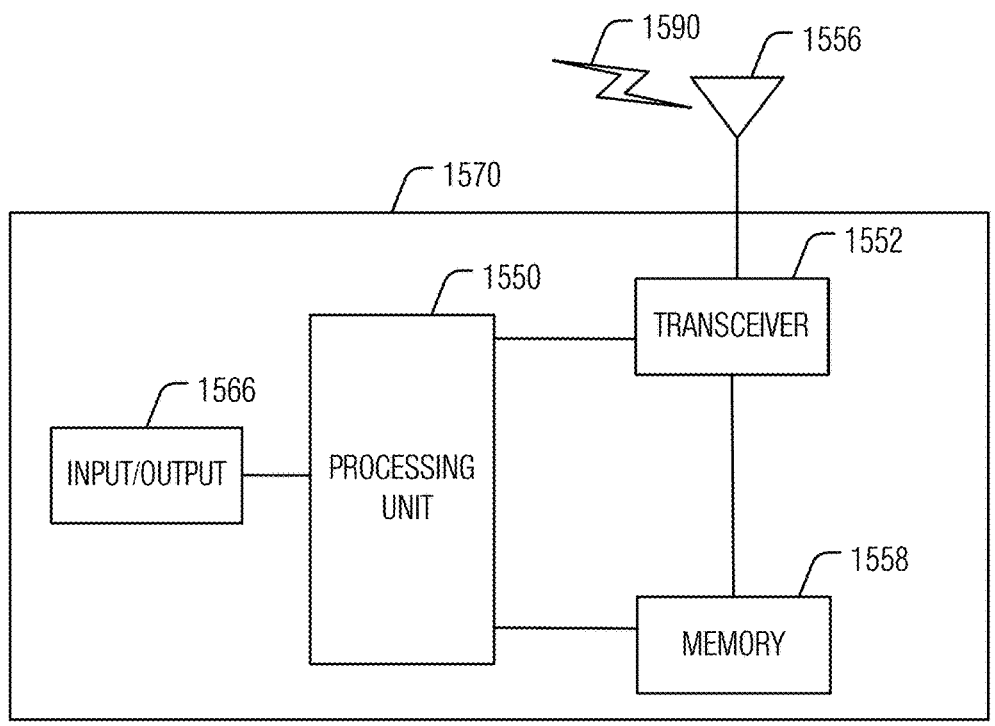

FIGS. 15A and 15B illustrate example devices that may implement the methods and teachings according to this disclosure. In particular, FIG. 15A illustrates an example ED 1510, and FIG. 15B illustrates an example base station 1570. These components could be used in the system 1400 or in any other suitable system.

As shown in FIG. 15A, the ED 1510 includes at least one processing unit 1500. The processing unit 1500 implements various processing operations of the ED 1510. For example, the processing unit 1500 could perform signal coding, data processing, power control, input/output processing, or any other functionality enabling the ED 1510 to operate in the system 1400. The processing unit 1500 also supports the methods and teachings described in more detail above. Each processing unit 1500 includes any suitable processing or computing device configured to perform one or more operations. Each processing unit 1500 could, for example, include a microprocessor, microcontroller, digital signal processor, field programmable gate array, or application specific integrated circuit.

The ED 1510 also includes at least one transceiver 1502. The transceiver 1502 is configured to modulate data or other content for transmission by at least one antenna or NIC (Network Interface Controller) 1504. The transceiver 1502 is also configured to demodulate data or other content received by the at least one antenna 1504. Each transceiver 1502 includes any suitable structure for generating signals for wireless or wired transmission or processing signals received wirelessly or by wire. Each antenna 1504 includes any suitable structure for transmitting or receiving wireless or wired signals. One or multiple transceivers 1502 could be used in the ED 1510, and one or multiple antennas 1504 could be used in the ED 1510. Although shown as a single functional unit, a transceiver 1502 could also be implemented using at least one transmitter and at least one separate receiver.

The ED 1510 further includes one or more input/output devices 1506 or interfaces (such as a wired interface to the Internet 1450). The input/output devices 1506 facilitate interaction with a user or other devices (network communications) in the network. Each input/output device 1506 includes any suitable structure for providing information to or receiving or providing information from a user, such as a speaker, microphone, keypad, keyboard, display, or touch screen, including network interface communications.

In addition, the ED 1510 includes at least one memory 1508. The memory 1508 stores instructions and data used, generated, or collected by the ED 1510. For example, the memory 1508 could store software or firmware instructions executed by the processing unit(s) 1500 and data used to reduce or eliminate interference in incoming signals. Each memory 1508 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 15B, the base station 1570 includes at least one processing unit 1550, at least one transceiver 1552, which includes functionality for a transmitter and a receiver, one or more antennas 1556, at least one memory 1558, and one or more input/output devices or interfaces 1566. A scheduler, which would be understood by one skilled in the art, is coupled to the processing unit 1550. The scheduler could be included within or operated separately from the base station 1570. The processing unit 1550 implements various processing operations of the base station 1570, such as signal coding, data processing, power control, input/output processing, or any other functionality. The processing unit 1550 can also support the methods and teachings described in more detail above. Each processing unit 1550 includes any suitable processing or computing device configured to perform one or more operations. Each processing unit 1550 could, for example, include a microprocessor, microcontroller, digital signal processor, field programmable gate array, or application specific integrated circuit.

Each transceiver 1552 includes any suitable structure for generating signals for wireless or wired transmission to one or more EDs or other devices. Each transceiver 1552 further includes any suitable structure for processing signals received wirelessly or by wire from one or more EDs or other devices. Although shown combined as a transceiver 1552, a transmitter and a receiver could be separate components. Each antenna 1556 includes any suitable structure for transmitting or receiving wireless or wired signals. While a common antenna 1556 is shown here as being coupled to the transceiver 1552, one or more antennas 1556 could be coupled to the transceiver(s) 1552, allowing separate antennas 1556 to be coupled to the transmitter and the receiver if equipped as separate components. Each memory 1558 includes any suitable volatile or non-volatile storage and retrieval device(s). Each input/output device 1566 facilitates interaction with a user or other devices (network communications) in the network. Each input/output device 1566 includes any suitable structure for providing information to or receiving/providing information from a user, including network interface communications.

Figure 16:
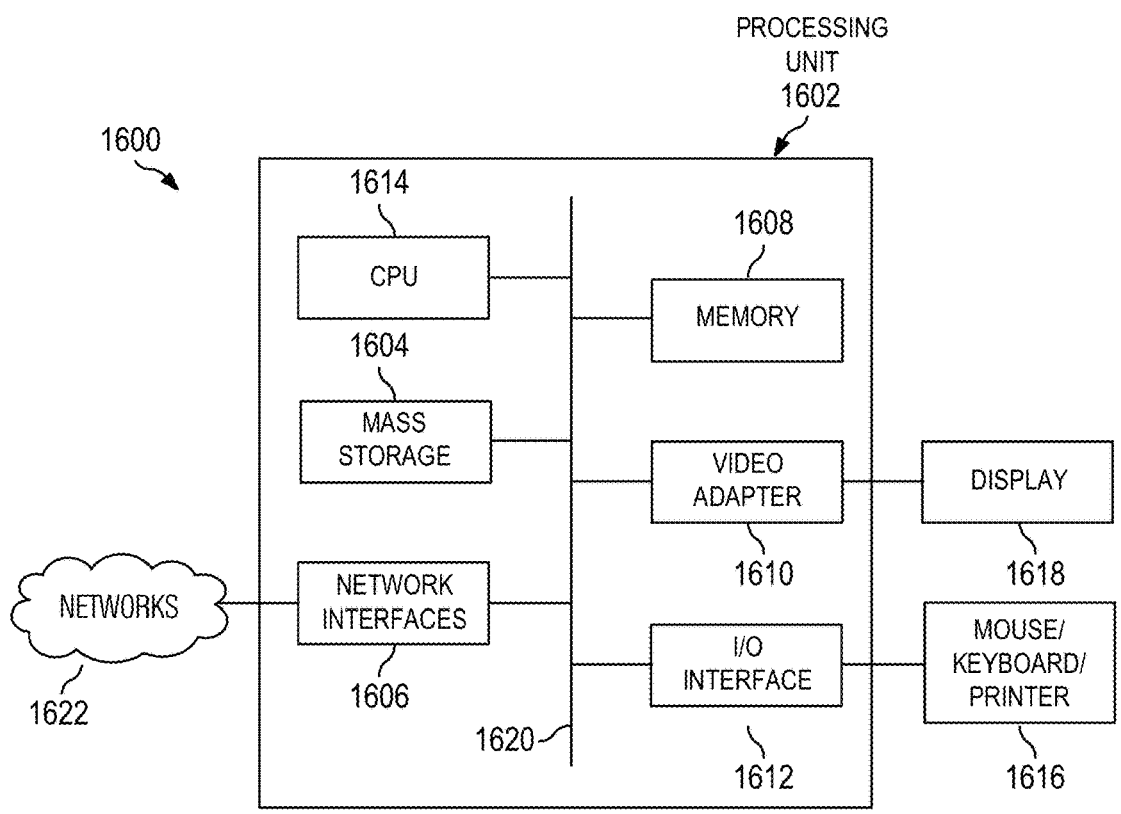
FIG. 16 is a block diagram of a computing system that may be used for implementing the devices and methods disclosed herein.

FIG. 16 is a block diagram of a computing system 1600 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1600 includes a processing unit 1602. The processing unit includes a central processing unit (CPU) 1614, memory 1608, and may further include a mass storage device 1604, a video adapter 1610, and an I/O interface 1612 connected to a bus 1620.

The bus 1620 may be one or more of any type of several bus architectures including a memory bus or memory controller, a peripheral bus, or a video bus. The CPU 1614 may comprise any type of electronic data processor. The memory 1608 may comprise any type of non-transitory system memory such as static random access memory (SRAM), dynamic random access memory (DRAM), synchronous DRAM (SDRAM), read-only memory (ROM), or a combination thereof. In an embodiment, the memory 1608 may include ROM for use at boot-up, and DRAM for program and data storage for use while executing programs.

The mass storage 1604 may comprise any type of non-transitory storage device configured to store data, programs, and other information and to make the data, programs, and other information accessible via the bus 1620. The mass storage 1604 may comprise, for example, one or more of a solid state drive, hard disk drive, a magnetic disk drive, or an optical disk drive.

The video adapter 1610 and the I/O interface 1612 provide interfaces to couple external input and output devices to the processing unit 1602. As illustrated, examples of input and output devices include a display 1618 coupled to the video adapter 1610 and a mouse, keyboard, or printer 1616 coupled to the I/O interface 1612. Other devices may be coupled to the processing unit 1602, and additional or fewer interface cards may be utilized. For example, a serial interface such as Universal Serial Bus (USB) (not shown) may be used to provide an interface for an external device.

The processing unit 1602 also includes one or more network interfaces 1606, which may comprise wired links, such as an Ethernet cable, or wireless links to access nodes or different networks. The network interfaces 1606 allow the processing unit 1602 to communicate with remote units via the networks. For example, the network interfaces 1606 may provide wireless communication via one or more transmitters or transmit antennas and one or more receivers or receive antennas. In an embodiment, the processing unit 1602 is coupled to a local-area network 1622 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a measuring unit or module, an adjusting unit or module, a selecting unit or module, a combining unit or module, an adding unit or module, a determining unit or module, an updating unit or module, and or or a performing unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a device, the method comprising:
   measuring, by the device, a radio condition of channels between the device and each of a plurality of candidate serving nodes in a communications system, thereby producing radio condition measurements;
   selecting, by the device, a serving node from the plurality of candidate serving nodes in accordance with the radio condition measurement and stratum information of each of the plurality of candidate serving nodes;
   transmitting, by the device, a message to the selected serving node, the message indicating the device joining the communications system;
   receiving, by the device, in response to the transmitted message, a relay node identifier (RN_ID) assigned to the device from the selected serving node, the RN_ID uniquely identifying the device as a relay node, wherein the RN_ID is encapsulated in a radio resource control (RRC) layer message; and
   routing, by the device, a packet from the selected serving node to a user equipment (UE) in accordance with an address that is at least partially based on the RN_ID.

2. The method of claim 1, wherein the plurality of candidate serving nodes comprises serving nodes with radio conditions that meet a first threshold, serving nodes with a number of hops to a donor access node that meet a second threshold, or both.

3. The method of claim 1, further comprising performing, by the device, an access procedure with the serving node.

4. The method of claim 1, wherein stratum information of each candidate serving node is related to a distance in a network between the candidate serving node and a donor access node.

5. The method of claim 1, wherein the radio condition measurements comprise one or more of reference signal received power (RSRP) measurements, reference signal received quality (RSRQ) measurements, received signal strength indication (RSSI) measurements, signal to noise ratio (SNR) measurements, or signal plus interference to noise ratio (SINR) measurements.

6. The method of claim 1, wherein selecting the serving node from the plurality of candidate serving nodes in accordance with the radio condition measurement and the stratum information of each of the plurality of candidate serving node comprises adjusting the radio condition measurement in accordance with the stratum information and combining the adjusted radio condition measurement with an offset associated with the candidate serving node.

7. The method of claim 6, wherein combining the adjusted radio condition measurement and the offset comprises adding the adjusted radio condition measurement and the offset.

8. The method of claim 1, wherein the stratum information is broadcast to the device.

9. The method of claim 1, wherein the stratum information is advertised by the plurality of candidate serving nodes.

10. The method of claim 1, wherein the stratum information is determined in accordance with identifiers of candidate serving nodes of the plurality of candidate serving nodes.

11. The method of claim 1, wherein the routing of a packet from the selected serving node to a user equipment (UE) is in accordance with an address comprised of the RN_ID and a UE identifier (UE_ID), the UE_ID uniquely identifying the UE.

12. The method of claim 1, further comprising, receiving by the device in response to the transmitted message, a next hop address for each adjacent relay node in the communications network, the next hop address identifying a path between the device and the adjacent relay node.

13. A device comprising:
a non-transitory memory storage comprising instructions; and
one or more processors in communication with the non-transitory memory storage, wherein the one or more processors execute the instructions to:
measure a radio condition of channels between the device and each of a plurality of candidate serving nodes in a communications system, thereby producing radio condition measurements;
select a serving node from the plurality of candidate serving nodes in accordance with the radio condition measurement and stratum information of each of the plurality of candidate serving nodes;
transmit a message to the selected serving node, the message indicating the device joining the communications system;
receive, in response to the transmitted message, a relay node identifier (RN_ID) assigned to the device from the selected serving node, the RN_ID uniquely identifying the device as a relay node, wherein the RN_ID is encapsulated in a radio resource control (RRC) layer message; and
route a packet from the selected serving node to a user equipment (UE) in accordance with an address that is at least partially based on the RN_ID.

14. The device of claim 13, wherein the plurality of candidate serving nodes comprises serving nodes with radio conditions that meet a first threshold, serving nodes with a number of hops to a donor access node that meet a second threshold, or both.

15. The device of claim 13, wherein the one or more processors execute the instructions to perform an access procedure with the serving node.

16. The device of claim 13, wherein stratum information of each candidate serving node is related to a distance in a network between the candidate serving node and a donor access node.

17. The device of claim 13, wherein the radio condition measurements comprise one or more of reference signal received power (RSRP) measurements, reference signal received quality (RSRQ) measurements, received signal strength indication (RSSI) measurements, signal to noise ratio (SNR) measurements, or signal plus interference to noise ratio (SINR) measurements.

18. The device of claim 13, wherein the one or more processors execute the instructions to select the serving node from the plurality of candidate serving nodes in accordance with the radio condition measurement and the stratum information of each of the plurality of candidate serving nodes by executing instructions to adjust the radio condition measurement in accordance with the stratum information and combine the adjusted radio condition measurement with an offset associated with the candidate serving node.

19. The device of claim 13, wherein the stratum information is broadcast to the device.

20. The device of claim 13, wherein the stratum information is advertised by the plurality of candidate serving nodes.

21. The device of claim 13, wherein the stratum information is determined in accordance with identifiers of candidate serving nodes of the plurality of candidate serving nodes.

22. The device of claim 13, wherein the routing of a packet from the selected serving node to a user equipment (UE) is in accordance with an address comprised of the RN_ID and a UE identifier (UE_ID), the UE_ID uniquely identifying the UE.

23. The device of claim 13, further comprising, receiving by the device in response to the transmitted message, a next hop address for each adjacent relay node in the communications network, the next hop address identifying a path between the device and the adjacent relay node.

24. A non-transitory computer-readable media storing computer instructions, that when executed by one or more processors, cause the one or more processors to perform the steps of:
measuring a radio condition of channels between a device and each of a plurality of candidate serving nodes in a communications system, thereby producing radio condition measurements;
selecting a serving node from the plurality of candidate serving nodes in accordance with the radio condition measurement and stratum information of each of the plurality of candidate serving nodes;
transmitting a message to the selected serving node, the message indicating the device joining the communications system;
receiving, in response to the transmitted message, a relay node identifier (RN_ID) assigned to the device from the selected serving node, the RN_ID uniquely identifying the device as a relay node, wherein the RN_ID is encapsulated in a radio resource control (RRC) layer message; and
routing a packet from the selected serving node to a user equipment (UE) in accordance with an address that is at least partially based on the RN_ID.

25. The non-transitory computer-readable media of claim 24, wherein the plurality of candidate serving nodes comprises serving nodes with radio conditions that meet a first threshold, serving nodes with a number of hops to a donor access node that meet a second threshold, or both.

26. The non-transitory computer-readable media of claim 24, wherein the computer instructions, that when executed by the one or more processors, cause the one or more processors to perform the step of performing an access procedure with the serving node.

27. The non-transitory computer-readable media of claim 24, wherein stratum information of each candidate serving node is related to a distance in a network between the candidate serving node and a donor access node.

28. The non-transitory computer-readable media of claim 24, wherein the radio condition measurements comprise one or more of reference signal received power (RSRP) measurements, reference signal received quality (RSRQ) measurements, received signal strength indication (RSSI) measurements, signal to noise ratio (SNR) measurements, or signal plus interference to noise ratio (SINR) measurements.

29. The non-transitory computer-readable media of claim 24, wherein the stratum information is advertised by the plurality of candidate serving nodes.

30. The non-transitory computer-readable media of claim 24, wherein the stratum information is determined in accordance with identifiers of candidate serving nodes of the plurality of candidate serving nodes.

31. The non-transitory computer-readable media of claim 24, wherein the routing of a packet from the selected serving node to a user equipment (UE) is in accordance with an address comprised of the RN_ID and a UE identifier (UE_ID), the UE_ID uniquely identifying the UE.

32. The non-transitory computer-readable media of claim 24, further comprising, receiving in response to the transmitted message, a next hop address for each adjacent relay node in the communications network, the next hop address identifying a path between the device and the adjacent relay node.

* * * * *